(12) United States Patent
Wishart

(10) Patent No.: US 10,116,187 B1
(45) Date of Patent: Oct. 30, 2018

(54) THIN-PROFILE COUNTER-ROTATING DIFFERENTIAL ELECTRIC MOTOR ASSEMBLY

(71) Applicant: Randell J. Wishart, Reno, NV (US)

(72) Inventor: Randell J. Wishart, Reno, NV (US)

(73) Assignee: CR FLIGHT LLC, Sacramento, CA (US)

(*) Notice: Subject to any disclaimer, the term of this patent is extended or adjusted under 35 U.S.C. 154(b) by 283 days.

(21) Appl. No.: 15/330,324

(22) Filed: Sep. 6, 2016

Related U.S. Application Data

(60) Provisional application No. 62/284,535, filed on Oct. 2, 2015.

(51) Int. Cl.
| | |
|---|---|
| *H02K 16/00* | (2006.01) |
| *H02K 7/14* | (2006.01) |
| *H02K 1/24* | (2006.01) |
| *H02K 1/27* | (2006.01) |
| *H02K 7/08* | (2006.01) |
| *H02K 11/33* | (2016.01) |
| *H02K 21/12* | (2006.01) |
| *H02K 16/02* | (2006.01) |
| *B64C 27/10* | (2006.01) |
| *B64C 27/14* | (2006.01) |
| *B64D 27/24* | (2006.01) |

(52) U.S. Cl.
CPC ............... *H02K 7/14* (2013.01); *B64C 27/10* (2013.01); *B64C 27/14* (2013.01); *B64D 27/24* (2013.01); *H02K 1/24* (2013.01); *H02K 1/2786* (2013.01); *H02K 7/08* (2013.01); *H02K 11/33* (2016.01); *H02K 16/02* (2013.01); *H02K 21/12* (2013.01)

(58) Field of Classification Search
CPC .......................................... H02K 16/00–16/025
See application file for complete search history.

(56) References Cited

U.S. PATENT DOCUMENTS

| | | | |
|---|---|---|---|
| 2,431,255 A | 11/1947 | Jenkins | |
| 2,456,993 A | 12/1948 | Rambo | |
| 2,462,182 A | 2/1949 | Guerdan | |
| 3,738,270 A | 6/1973 | Hargett | |
| 4,056,746 A | 11/1977 | Burtis | |
| 4,259,604 A | 3/1981 | Aoki | |
| 4,375,047 A | 2/1983 | Nelson | |
| 4,645,963 A | 2/1987 | Plackner | |
| 5,067,932 A | 11/1991 | Edwards | |
| 5,089,734 A | 2/1992 | Bickraj | |
| 6,433,451 B1 | 8/2002 | Cherciu | |
| 8,464,511 B1 * | 6/2013 | Ribarov | B64C 11/48 60/226.1 |
| 8,531,072 B2 | 9/2013 | Wishart | |
| 9,184,649 B2 * | 11/2015 | Webster | H02K 16/00 |
| 9,499,277 B2 * | 11/2016 | Chantriaux | H02P 5/74 |
| 2006/0163963 A1 | 7/2006 | Flores | |
| 2008/0089786 A1 * | 4/2008 | Sinreich | B63H 5/10 416/129 |

(Continued)

*Primary Examiner* — Alexander Talpalatski
(74) *Attorney, Agent, or Firm* — James M. Ritchey

(57) ABSTRACT

An efficient thin-profile counter-rotating (CR) differential electric motor assembly is utilized to power an aircraft vehicle or fan for moving a gas and includes two oppositely rotating propellers that may be mounted to horizontal flight and vertical lift-off aircraft or a fan housing in spaces similar in size to mounting spaces for traditional motors having only one propeller.

20 Claims, 14 Drawing Sheets

(56) References Cited

U.S. PATENT DOCUMENTS

| | | | |
|---|---|---|---|
| 2009/0289516 A1* | 11/2009 | Hopewell | F02C 7/32 310/115 |
| 2010/0236849 A1* | 9/2010 | Wishart | B60K 7/0007 180/65.51 |
| 2013/0181562 A1* | 7/2013 | Gieras | H02K 16/02 310/114 |

* cited by examiner

THIN-PROFILE COUNTER-ROTATING DIFFERENTIAL ELECTRIC MOTOR ASSEMBLY

CROSS-REFERENCE TO RELATED APPLICATIONS

This application claims priority to, and the benefit of, U.S. provisional patent application Ser. No. 62/284,535 filed on Oct. 2, 2015, incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to a counter-rotating (CR) differential electric motor assembly, frequently for powering an aircraft or for air-movement/fan technologies. More specifically, the subject invention is a thin-profile CR differential electric motor assembly that is often utilized to power horizontal flight and vertical take-off and landing aircraft and permits two associated propellers to rotate very close to one another about a common central axis, wherein the airflow generated by one propeller is differentially coupled into the rotation of the other propeller, thereby increasing the efficiency of power consumption by the CR motor over an equivalent standard/traditional motor that rotates a single propeller. By having a thin-profile, the subject invention may be employed with aircraft or fan housings in spaces that were originally configured for standard/traditional motors.

2. Background Discussion

For a traditional brush-containing DC motor, the outside/surrounding motor housing is stationary, as is the stator/field magnets within the housing. Normally, the stator is usually affixed to the housing. An internal armature/rotor is attached to a shaft or axel that rotates during operation (in some versions of a standard motor the rotor may be termed the armature). Thus, the armature shaft/axel extends out from the stationary motor housing and rotates when electrical current is applied to the motor (the armature/rotor rotates within the stationary stator/field magnets). In brush-containing motors, physical brushes are required to transmit the electricity from the outside source to the rotor via a commutator interfacing that pulses the current to alternate the field polarity in the coils of the armature, thereby generating the rotational driving force used to turn the armature. The history of traditional brush-containing electric motors is extensive.

For a traditional brushless DC motor, the outside/surrounding motor housing is, again, stationary, as is the stator within the housing. Normally, the stator is usually affixed to the housing. An internal armature/rotor is attached to a shaft or axel that rotates during operation. Thus, the armature shaft/axel extends out from the stationary motor housing and rotates when electrical current is applied to the motor (the armature/rotor rotates within the stationary stator/field magnets). In brushless motors, physical brushes are not required to transmit the electricity from the outside source to the rotor. The configuration of brushless motors permits either a design utilizing permanent magnets affixed to the stator or, more commonly, the permanent magnets are associated with the armature and the field winding are located in the stationary stator. Clearly, brushless motors do not use physical brushes for commutation; instead, they are electronically commutated by standard techniques. Suitably pulsed currents are delivered to the windings and timed via incorporated means such as standard Hall Effect sensors/magnets, back emf, and equivalent means. Brushless DC motors have many well-known advantages over brush-containing motors.

A counter-rotating electric DC motor is described in related U.S. Pat. Nos. 2,431,255, 2,456,993, and 2,462,182. The disclosed motor was to be used in torpedo propulsion systems in which a coaxial propeller assembly drove separate propellers in opposite directions to aid in keeping the torpedo traveling in a desired direction. Clearly, the operational lifetime of such a motor is extremely limited, given its destruction upon hitting a target. To eliminate necessary centrifugal/centripetal influenced commutator-to-brush contact breaks created while the stator is rotating (normally the stator is not rotating so a constant resilient means or spring simply forces a brush inward and towards the center of rotation, thereby contacting the commutator for the required electrical communication, but rotation of the stator causes the brushes to "float" away from the commutator), the device contained a "radial commutator" (a disk extending outwardly from the axis of rotation) and contact brushes directed parallel to the axis of rotation. This radial commutator/brush design is complex, not easily fabricated, and, thus, expensive to manufacture.

In U.S. Pat. No. 3,738,270 a brushless electric DC motor for a torpedo is disclosed. To maintain stability during its course in water to its target, oppositely rotating propellers are beneficial. The design utilizes a stationary stator around which two independent armatures rotate in opposite directions to drive the associated propellers in corresponding opposite directions.

U.S. Pat. No. 4,056,746 presents a counter rotation electric motor that is quite similar to the design presented immediately above. Once again a radial commutator/brush design is utilized in the operation of the device.

A DC rotary machine is related in U.S. Pat. No. 4,259,604. The commutator/brush design in this device is very simplistic and is not created to operate at high rotational velocities. Typically, the motor is used in a machine such as a tape recorder, VTR, and the like that need low rotational speeds. The commutator is of standard cylindrical design and the brushes are contacted in a permanent fashion against the commutator bars.

U.S. Pat. Nos. 8,198,773; 8,253,294; and 8,531,072 (issued to the subject Applicant) are for various counter-rotating motor/generator applications.

BRIEF SUMMARY

An object of the technology described herein is to provide a thin-profile CR differential electric motor assembly that is utilized to power horizontal flight and vertical take-off and landing aircraft.

An additional object of the technology described herein is to provide a thin-profile CR differential electric motor assembly that is utilized to power a fan for the movement of air or other gases.

Another object of the technology described herein is to furnish a thin-profile CR differential electric motor assembly, with two propellers, that is utilized to power horizontal flight and vertical take-off and landing aircraft that requires approximately the same space allocation as a traditional/standard motor, with one propeller, does in the aircraft.

A further object of the technology described herein is to supply a thin-profile CR differential electric motor assembly that is utilized to power horizontal flight and vertical take-off and landing aircraft with decreased electrical power input relative to mechanical power output when compared with a standard/traditional motor having a single propeller.

Still another object of the technology described herein is to disclose a thin-profile CR differential electric motor assembly that is utilized to power horizontal flight and vertical take-off and landing aircraft with increased battery life and more thrust that an equivalent standard/traditional motor.

Still an additional object of the subject invention is to disclose a CR motor that utilizes a combination of 1) added energy not wasted to a traditional motor mount, 2) added energy due to lower heat production, and 3) synergistic differential coupling between the two oppositely rotating members to increase their net rotational velocities to increase the efficiency of the CR motor over a standard motor.

Disclosed is a thin-profile CR differential electric motor assembly utilized to power an aircraft vehicle or fan that comprises: a) a counter rotating differential electric motor with two oppositely rotating members, wherein a first rotating member includes permanent magnets and a second rotating member included field windings; b) a first set of propeller blades secured to one of the oppositely rotating member and a second set of propeller blades secured to the other set of oppositely rotating propeller blades; c) means for carrying electricity to the field coils from an electric power supply and controller; d) means for mounting the motor assembly to the vehicle or fan; e) optionally, the control means for operating the CR motor assembly; f) and optionally, the electric power supply.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

DETAILED DESCRIPTION

Figure 1:
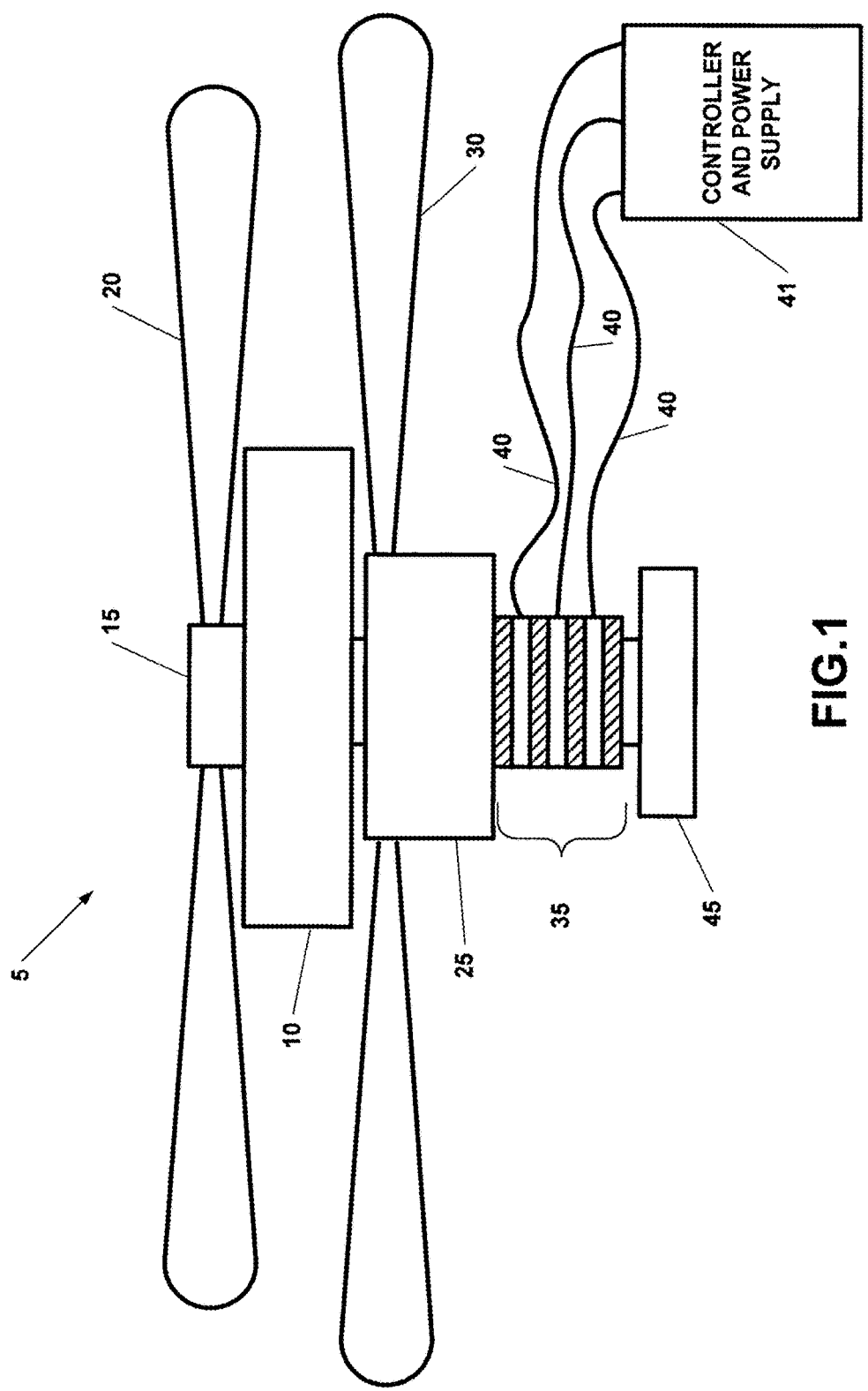
FIG. 1 is a side view of an embodiment of the subject invention.

Referring more specifically to the drawings, for illustrative purposes the subject technology is embodied in the system generally shown in FIGS. 1 through 14. It will be appreciated that the subject system CR differential electric motor assembly may vary as to configuration and as to details of the components, and that the method may vary as to the specific steps and sequence of operation, without departing from the basic concepts as disclosed herein.

Generally, the subject invention is a thin-profile CR differential electric motor assembly utilized to power an aircraft vehicle or a fan for moving a gas that comprises: a) a central shaft having upper and lower ends and oriented along a central axis that provides structural support for the CR differential electric motor assembly; b) an outer rotational member having a upper and lower exterior surfaces and an interior surface, wherein the outer rotational member rotates, during operation, in a first direction about the central axis, wherein the interior surface comprises: i) an outer perimeter wall; ii) an upper support structure; and iii) a lower support structure; c) a plurality of permanent magnets secured inside the first rotational member proximate the outer perimeter wall; d) a first bearing assembly secured to the outer rotational member that permits the outer rotational member to rotate in the first direction about the central axis; e) an inner rotational member that rotates, during operation, about the central axis in an opposite second direction to the first rotational member; wherein the inner rotational member comprises: i) a set of radially disposed field windings and ii) a second bearing assembly secured to said field windings that permits said field windings to rotate around said central axis between said permanent magnets and said central shaft in said second direction; f) an outer propeller assembly secured directly to the outer rotational member's exterior surface, wherein the outer propeller assembly comprises at least two propeller blades that extend from a central hub; g) an inner propeller assembly secured to said inner rotational member and positioned adjacent the outer rotational member's lower exterior surface, wherein the inner propeller assembly comprises: i) the second bearing assembly and ii) at least two propeller blades connected to the second bearing assembly; and h) means for carrying electricity to the field windings from an outside power supply, wherein the electricity carrying means is positioned adjacent to and below the inner propeller assembly, encircling the central shaft, and rotating with the inner propeller assembly in the second direction. The first bearing assembly may located proximate the central shaft lower end and the central shaft rotates within the first bearing assembly or the first bearing assembly may be located proximate the central shaft upper end and the central shaft is a non-rotating member of the CR differential electric motor assembly. Further, the second bearing assembly propeller blades are detachable or foldable. Additionally, usually a propeller housing is secured to the second bearing assembly and the means for carrying electricity, into which the second bearing assembly propeller blades are mounted. Also, the subject invention usually includes a) a mounting member secured to the central shaft's lower end; b) an electronic controller for operating the motor in communication with the electricity carrying means; c) and a power supply for powering the motor in communication with the electricity carrying means.

As shown in FIG. 1, the subject invention 5 generally comprises a CR motor 10 that is fastened to an outer propeller assembly having a central hub 15 and two or more attached first blades 20 and an inner propeller assembly having a propeller housing 25 and two of more attached second blades 30. Since the CR motor has two oppositely rotating members with one having permanent magnets and the other having field windings, a non-traditional/standard means is required to deliver electricity to those windings via an electrical carrying means 35. Specifically, slip rings 35 are one suitable electricity delivery means, but other equivalent are contemplated to be within the realm of this disclosure such as electrically conducting ball or roller bearings and the like. Electrical connection means, usually wires 40, run to a controller and power source/supply 41, wherein the controller and power source/supply 41 are located on the aircraft vehicle and the onboard controller, normally, is in communication with a ground controller unit operated by a user. An aircraft mounting member 45 is usually included in the subject invention to facilitate attachment to a desired aircraft.

Figure 2:
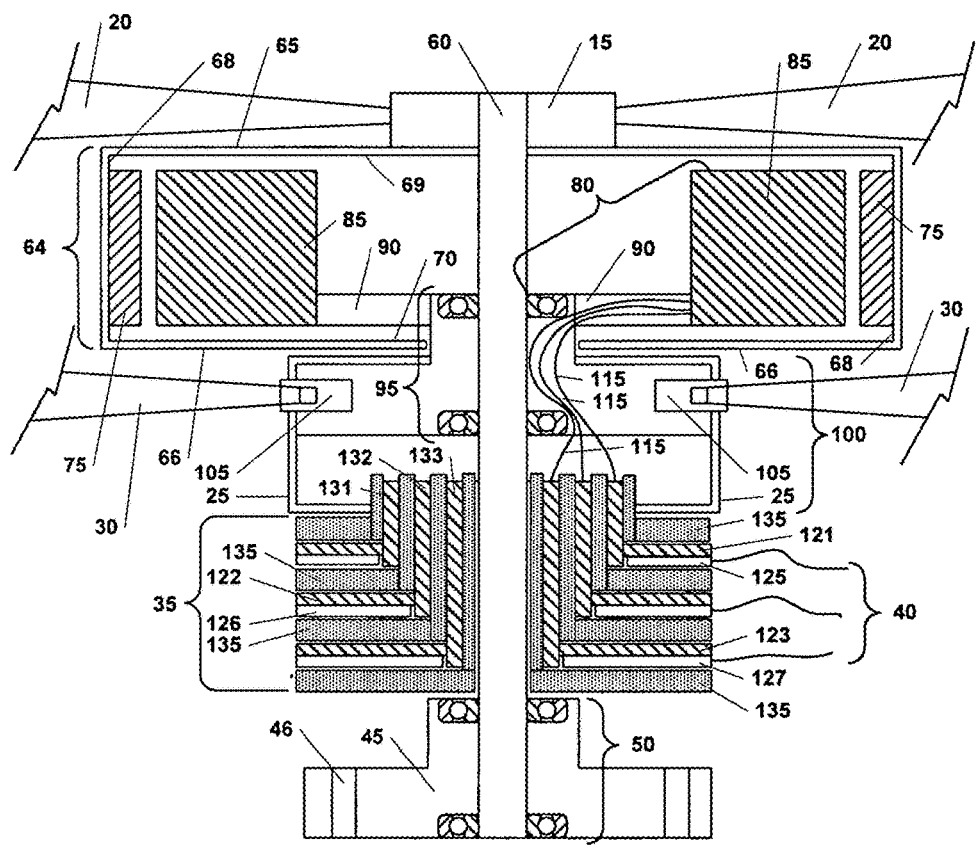
FIG. 2 is a cross-sectional view of another embodiment of the subject invention that utilized a rotating central shaft.
Figure 3:
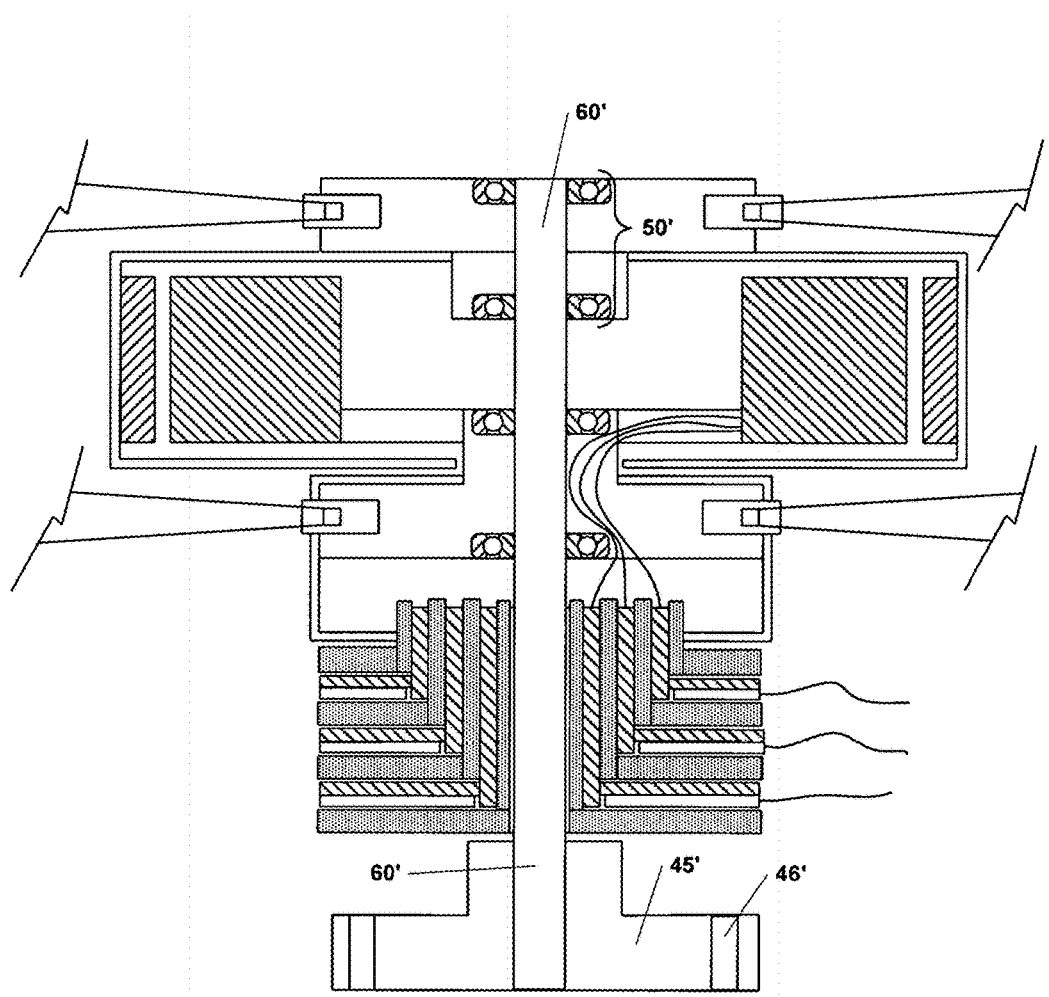
FIG. 3 is a cross-sectional view of a further embodiment of the subject invention that utilizes a stationary central shaft.

FIGS. 2 and 3 show detailed information about two embodiments of the subject invention. Both embodiments utilize a three phase wiring configuration, but other wiring configuration are contemplated to be within the realm of this disclosure. The two depicted embodiments differ in the location of a first bearing assembly. Specifically, FIG. 2 has a first bearing assembly 50 in which a rotating central shaft 60 rotates and the first bearing assembly is located within or proximate to a mounting member 45 that is utilized for securing the subject motor to an aircraft (the first bearing assembly position differs from the embodiment depicted in FIG. 3). More specifically, the subject embodiment shown in FIG. 2 comprises a central shaft 60 (with upper and lower ends) that has a central axis that run through the long dimension of the shaft 60. The central shaft 60 is rigidly attached at or proximate to its upper end to the outer propeller assembly 61 that comprises the outer propeller hub 15 and associated propellers blades 20. There are two or more blades 20 for each propeller assembly. It is noted that the length or each propeller and the angle of each blade may be varied to achieve maximum desirable operational characteristics for each application of the subject motor. During operation of the subject motor, the central shaft 60 and attached propeller blades 20 will rotated in a first rotational direction.

The CR motor comprises an outer rotational member 64 that has upper 65 and lower 66 exterior surfaces and an interior surface. During operation, the outer rotational member rotates in the first rotational direction. The interior surface of the outer rotational member comprises and outer perimeter wall 68, an upper support structure 69, and a lower support structure 70 (the lower support structure includes the lower 66 exterior surface).

The electro-mechanical means for creating rotational force comprises permanent magnets and electromagnets, however, if desired, electromagnets may replace the permanent magnets and the physical locations of each may be reversed. For exemplary purposes only, and not by way of limitation, permanent magnets in combination with electromagnets are utilized in the subject examples. The outer rotational member 64 includes a plurality of permanent magnets 75. The plurality of permanent magnets 75 are secured to the interior surface's outer perimeter wall 68. These permanent magnets 75 may be switched with electromagnets, if desired, with a suitable power supply provided. The outer propeller assembly 61, comprising the blades 20 and outer propeller hub 15, is secured by the outer propeller hub 15 to the upper exterior surface 65 of the outer rotational member 64 by standard means such as bolts, screws, gluing, welding, and equivalent means.

The inner rotational member 80 comprises field windings/coils 85 attached to support arms 90 which extend from a second bearing assembly 95 which rotates, during operation, about the central shaft 60. It is stressed that the field windings may be replaced with either electromagnets or permanent magnets if the field windings are located on the outer rotational member. Also, secured to the second bearing assembly 95 is an inner propeller assembly 100 that is positioned adjacent to the outer rotational member's lower surface 66. During operation the inner propeller assembly 100 rotates about said central shaft 60 in an opposite direction to the rotation of the outer propeller assembly 61. Connected to the inner propeller assembly 100 are at least two propeller blades 30. The propeller blades 30 are mounted to the inner propeller assembly 100 by attachment means 105. The blade attachment means 105 permits each blade 30 to be either detached or folded/pivoted toward the central shaft 60. This permits access easy access to components of the subject motor 5.

Covering the second bearing assembly 95 and inner propeller assembly 100 is an inner propeller housing 25. The inner propeller housing 25 is secured to the second bearing assembly 95. The detachable or foldable blades 30 either mount directly to the propeller housing 25 or through it. The blade attachment means 105 are either secured directly in the second bearing assembly 95 or to the propeller housing 25, whichever is preferred for a particular specific application. The propeller housing 25 rotates, with the second propellers 30, about the central shaft 60 during operation of the subject motor 5. Additionally, the propeller housing 25 usually attaches by a pressure fit or other suitable means (including, but not limited to clamping, gluing, welding, threaded means, and the like) to the electricity carrying means 35, which also rotates about the central shaft 60 during operation of the subject motor 5.

The electricity carrying means 35 utilizes wiring 115 that supplies the field coil windings 85 on the inner rotational member 80 with electricity. Depending on the configuration of the field winding 85, one or more wires 115 may communicate with the field windings 85. In FIG. 2 (and FIG. 3) three wires (three phase configuration, but other equivalent wiring configuration are contemplated to be within the realm of this disclosure) 115 run from the field windings 85 to a set of slip rings 35 that comprise the electricity carrying means. Other equivalent electricity carrying means may be utilized, including, but not limited to, electrically conductive bearings and the like. The embodiment shown in FIGS. 2 and 3 employ slip rings that comprise a first members 121, 122, and 123 that are secured to electrically conductive tubular members 131, 132, and 133, respectively (brass or other electrically conductive material is acceptable for the tubular members) and rotate during operation of the subject motor 5. Electrical insulating material 135 (frequently thin insulating tubes around each electrically conductive tubular members 131, 132, and 133) is utilized to electrically isolate the components from one another and the remainder of the subject components. The set of electrically conductive tubular members 131, 132, and 133 are frequently pressure fitted within the propeller housing 25 and rotate with the propeller housing 25 and the associated propellers 30. Electrical wires 40 run from the stationary portions 125, 126, and 127 of the slip rings to the onboard (located on the aircraft) controller and power supply/source 41. The onboard power supply/source is frequently a suitable battery or batteries. Usually, the onboard controller is in remote communication with a ground controller by radio waves, infrared signals, or the equivalent.

The aircraft motor mount 45 frequently has apertures 46 that are utilized to secure the subject motor 5 to a selected aircraft. One advantage of the subject thin-profile CR differential motor assembly 5 is that it easily fits with the region a traditional/standard motor with propellers fits.

Specifically, FIG. 3 shows an embodiment of the subject invention that differs from the embodiment depicted in FIG. 2 since the FIG. 3 embodiment has a first bearing assembly 50' that rotates about a fixed central shaft 60' and the first bearing assembly 50' is located proximate the first blades 20. The central shaft 60' is fixed in the aircraft mount 45', which is then secured to the aircraft by apertures 46' by suitable means.

A power source is utilized to supply a suitable amount of electricity (specific CR motor-determined amperage and voltage levels) to the CR motor assembly. Additionally, a standard and easily purchased electronic speed controller (ESC) is employed to control the incoming electricity to actuate the field coil windings 85 in a pattern that creates the necessary magnetic repulsive forces to power rotation and to initiate rotation.

The differential or first-to-second propeller-feed-back action of the subject invention is important in explaining the effectiveness or efficiency of the subject invention which has two internally differentially-coupled propellers compared with a traditional/standard motor outfitted with only a single propeller. The set of blades on the first propeller encounters oncoming air and increases the velocity of the leaving air. The set of blades on the second propeller encounters the first propeller-accelerated air which causes the second rotational member to rotate faster, which in turn further accelerates the first rotational member and the internally differentially coupled two rotational members operate with a higher efficiency than a motor with only one propeller that provides no synergistic feed-back enhancement between rotational members, as is seen for the CR version (see the experimental trials and evidence below that proves this concept).

EXPERIMENTAL

For experimental trials and illustrative purposes only and not by way of limitation, various traditional/standard drone motors were utilized for modification into subject thin-profile CR differential electrical motor assemblies. Each original motor operates with only a rotating armature within a stationary stator. Once modified into a CR version (with outer and an inner rotating members), if either rotational member is stopped the modified version then operates as a traditional/standard motor with only one rotating member. The subject CR motor may be utilized with aircraft or with fans to move a gas.

Experiment #1

This test was conducted with an Outrunner A2212/13T at 1,000kv motor. The traditional/standard motor (a modified motor with one rotational member stopped) was operated at full power and was equipped with one (double bladed) propeller that was 10 inches in length and had a 4.7 pitch. The CR modified motor (with two oppositely spinning rotational members) was operated at full power and was equipped with two double bladed propellers: one was 12 inches long at a pitch of 4.5 and the other was 12 inches long at a pitch of 5.5. A freshly charged 2200 Li—Po three cell battery was utilized for each test and each test was stopped when the battery voltage dropped to 10 volts.

TABLE #1

Test #1

| MOTOR TYPE | CURRENT USED DURING TEST | THRUST MEASURED AT END OF TEST | TOTAL RUN TIME |
|---|---|---|---|
| STANDARD | 12.6 AMPS | 57 OZ | 5 MINS AND 57 SECS |
| CR | 8.7 AMPS | 58 OZ | 13 MINS AND 36 SECS |
| | 31% LESS CURRENT UTILIZED WITH CR | APPROXIMATELY THE SAME THRUST | CR VERSION RUNS 2.3 TIMES LONGER THAN STANDARD MOTOR |

Clearly, the CR version used significantly less current (31% less) and operates for a much longer time (2.3 times longer) than a standard motor.

Experiment #2

This test was conducted with an RC Timer 5010 at 620kv motor. The traditional/standard motor (a modified motor with one rotational member stopped) was operated at full power and was equipped with one (double bladed) propeller that was 10 inches in length and had a 4.5 pitch. The CR modified motor (with two oppositely spinning rotational members) was operated at full power and was equipped with two double bladed propellers: one was 12 inches long at a pitch of 5.5 and the other was 11 inches long at a pitch of 8.0. A freshly charged 2200 Li—Po three cell battery was utilized for each test.

TABLE #2

| | | Test #2 | | |
|---|---|---|---|---|
| MOTOR TYPE | VOLTS | SPEED IN RPM | CURRENT IN AMPS | THRUST IN POUNDS | POWER IN WATTS |
| STANDARD | 25.0 | 13,870 | 13.2 | 3.19 | 328 |
| CR | 25.0 | 6,935 + 6,935 = 13,870 | 13.2 | 4.06 | 328 |
| | | | | 27% MORE THRUST WITH CR | |

Clearly, the CR version produces significantly more thrust (27% more) with the listed parameters.

Experiment #3

This test was conducted with an RC Timer 5010 at 620kv motor. The traditional/standard motor (a modified motor with one rotational member stopped) was operated at full power and was equipped with one (double bladed) propeller that was 11 inches in length and had a 4.7 pitch. The CR modified motor (with two oppositely spinning rotational members) was operated at full power and was equipped with two double bladed propellers: one was 12 inches long at a pitch of 5.5 and the other was 11 inches long at a pitch of 8.0. A full power setting was utilized for the test. A freshly charged Li—Po six cell battery was utilized for each test.

TABLE #3

| | | Test #3 | | |
|---|---|---|---|---|
| MOTOR TYPE | VOLTS | SPEED IN RPM | CURRENT IN AMPS | THRUST IN POUNDS | POWER IN WATTS |
| STANDARD | 22.0 | 13,870 | 23.9 | 4.5 | 531 |
| CR | 22.2 | 6,935 + 6,935 = 13,870 | 24.2 | 6.5 | 537 |
| | | | | 44% MORE THRUST WITH CR | |

Clearly, the CR version produces significantly more thrust (44% more) with the listed parameters.

Experiment #4

This test was conducted with an RC Timer 5010 at 620kv motor. The traditional/standard motor (a modified motor with one rotational member stopped) was operated at full power and was equipped with one (double bladed) propeller that was 11 inches in length and had a 4.7 pitch. The CR modified motor (with two oppositely spinning rotational members) was operated at full power and was equipped with two double bladed propellers: one was 11 inches long at a pitch of 4.7 and the other was 11 inches long at a pitch of 8.0. A full power setting was utilized for the test. Freshly charged car batteries at 25.5 volts were utilized for each test.

TABLE #4

| | | Test #4 | | |
|---|---|---|---|---|
| MOTOR TYPE | VOLTS | CURRENT IN AMPS | THRUST IN POUNDS (EQUALIZED) | POWER IN WATTS |
| STANDARD | 25.5 | 19.1 | 3.8 | 531 |
| CR | 25.5 | 12.9 | 3.8 | 537 |
| | | 32% LESS CURRENT UTILIZED WITH CR | | |

Clearly, the CR version used significantly less current (32% less) for the same thrust.

Experiment #5: Pancake CR Motor with Two Props Versus Standard Pancake Motor with One Prop Pancake motors were purchased from RC Timer Company (Model 5010, rated at 620 kV) and some were modified into CR versions. A standard constant voltage power supply was utilized for these experiments.

Figure 4:
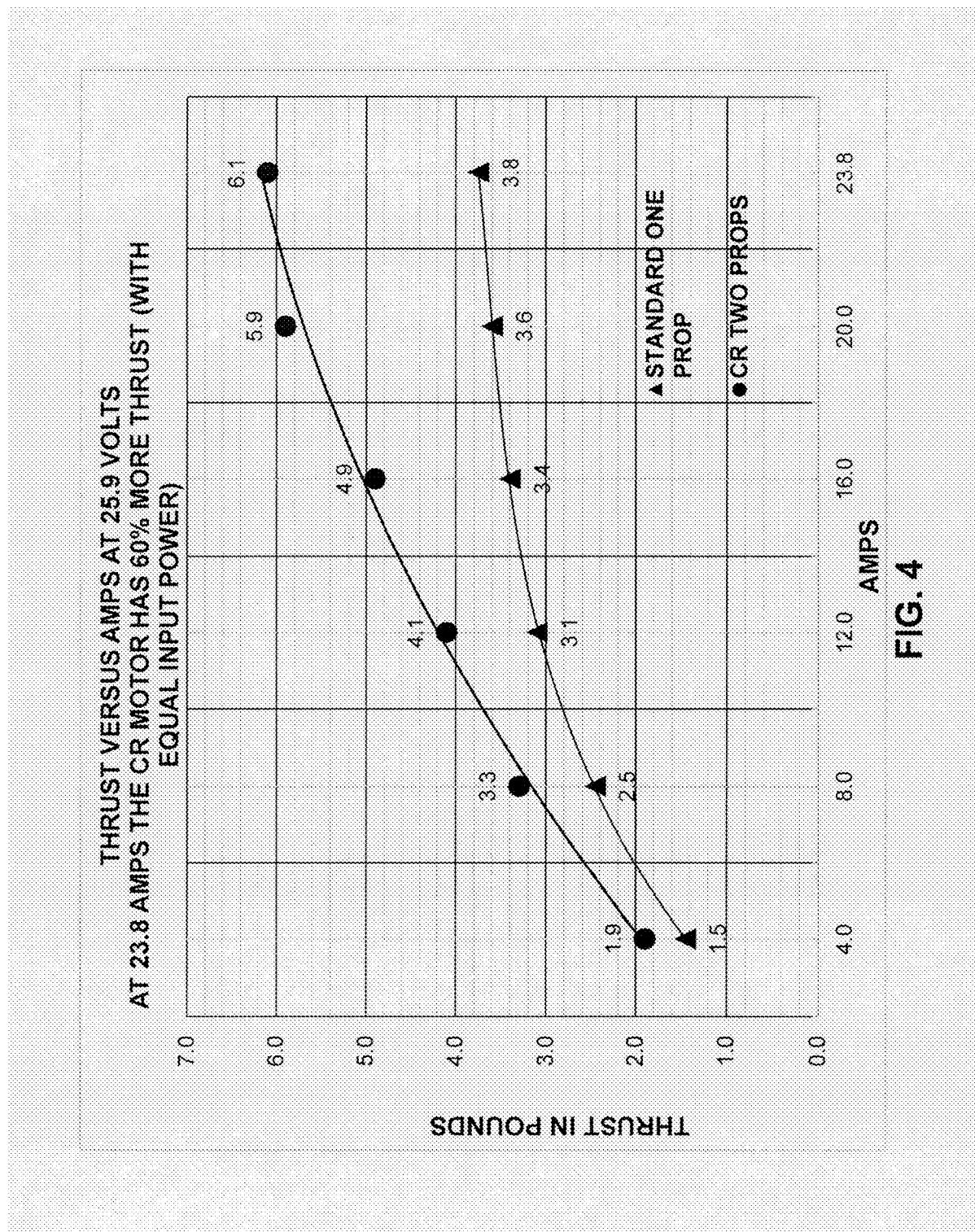
FIG. 4 is a graph of thrust versus amps for a standard motor with one propeller compared with a CR motor with two propellers.
Figure 5:
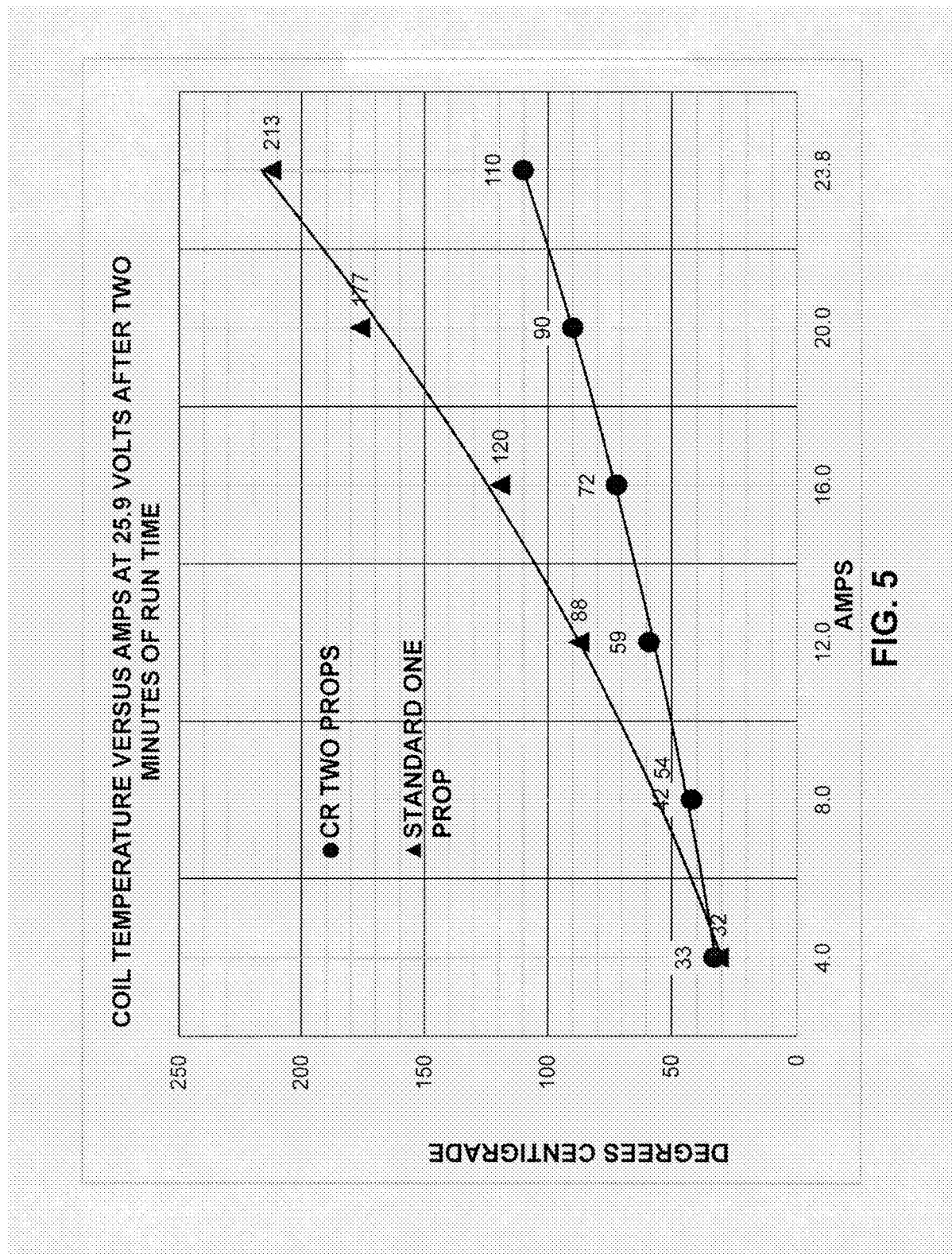
FIG. 5 is a graph of field coil temperature versus amps for a standard motor with one propeller compared with a CR motor with two propellers.

The data shown below in Test #5 utilizes the thin-profile (pancake) CR differential electric motor assembly described immediately above with an 12 inch with 5.5 pitch propeller on the standard motor and a front 12 inch with 5.5 pitch propeller and a rear 15.5 inch with 8.0 pitch propeller on the pancake CR motor. As shown in FIG. 4 (thrust versus amps) and FIG. 5 (temperature versus amps), the pancake CR motor with two propellers shows approximately a 60% increase in thrust over the pancake standard motor with one propeller and the pancake CR motor runs much cooler.

TABLE #5

| TEST #5 STANDARD HAS A 12 INCH AND 5.5 PROP CR HAS FRONT 12 INCH AND 5.5 PROP AND REAR 15.5 INCH AND 8.0 PROP ALL RUNS ARE FOR 2.0 MINUTES | | | | |
|---|---|---|---|---|
| MOTOR TYPE | AMPS | VOLTS | AVERAGE LOAD | AVERAGE COIL TEMP C. |
| AVERAGE STD ONE PROP | 4.0 | 25.9 | 1.5 | 32 |
| AVERAGE STD ONE PROP | 8.0 | 25.9 | 2.5 | 54 |
| AVERAGE STD ONE PROP | 12.0 | 25.9 | 3.1 | 88 |
| AVERAGE STD ONE PROP | 16.0 | 25.9 | 3.4 | 120 |
| AVERAGE STD ONE PROP | 20.0 | 25.9 | 3.6 | 177 |
| AVERAGE STD ONE PROP | 23.8 | 25.9 | 3.8 | 213 |
| CR | 4.0 | 25.9 | 1.9 | 33 |
| CR | 8.0 | 25.9 | 3.3 | 42 |

TABLE #5-continued

TEST #5
STANDARD HAS A 12 INCH AND 5.5 PROP
CR HAS FRONT 12 INCH AND 5.5 PROP AND
REAR 15.5 INCH AND 8.0 PROP
ALL RUNS ARE FOR 2.0 MINUTES

| MOTOR TYPE | AMPS | VOLTS | AVERAGE LOAD | AVERAGE COIL TEMP C. |
|---|---|---|---|---|
| CR | 12.0 | 25.9 | 4.1 | 59 |
| CR | 16.0 | 25.9 | 4.9 | 72 |
| CR | 20.0 | 25.9 | 5.9 | 90 |
| CR | 23.8 | 25.9 | 6.1 | 110 |

Figure 6:
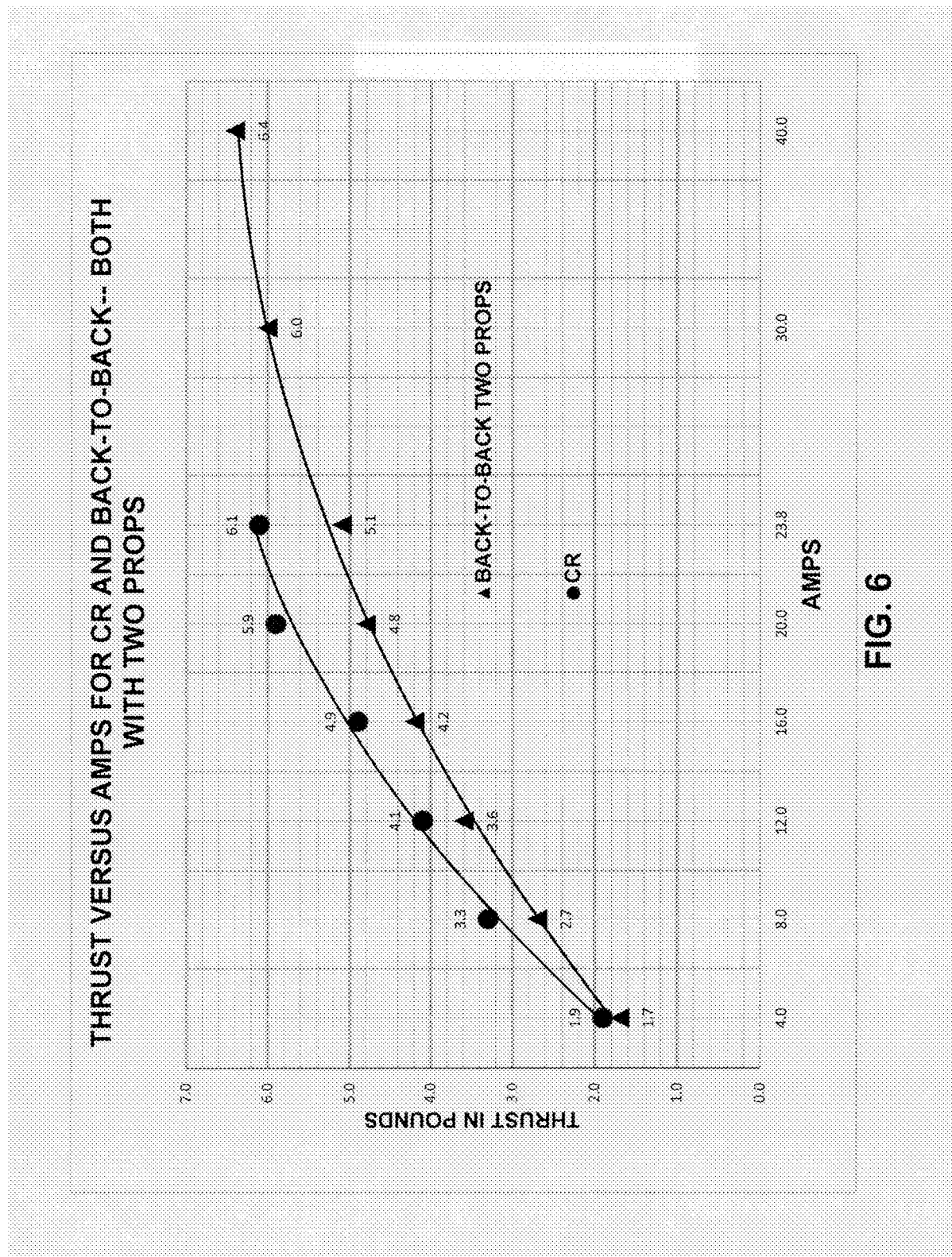
FIG. 6 is graph of thrust versus amps for a back-to-back motor system (two separate motors, each with a propeller) compared with a CR motor having two propellers.
Figure 7:
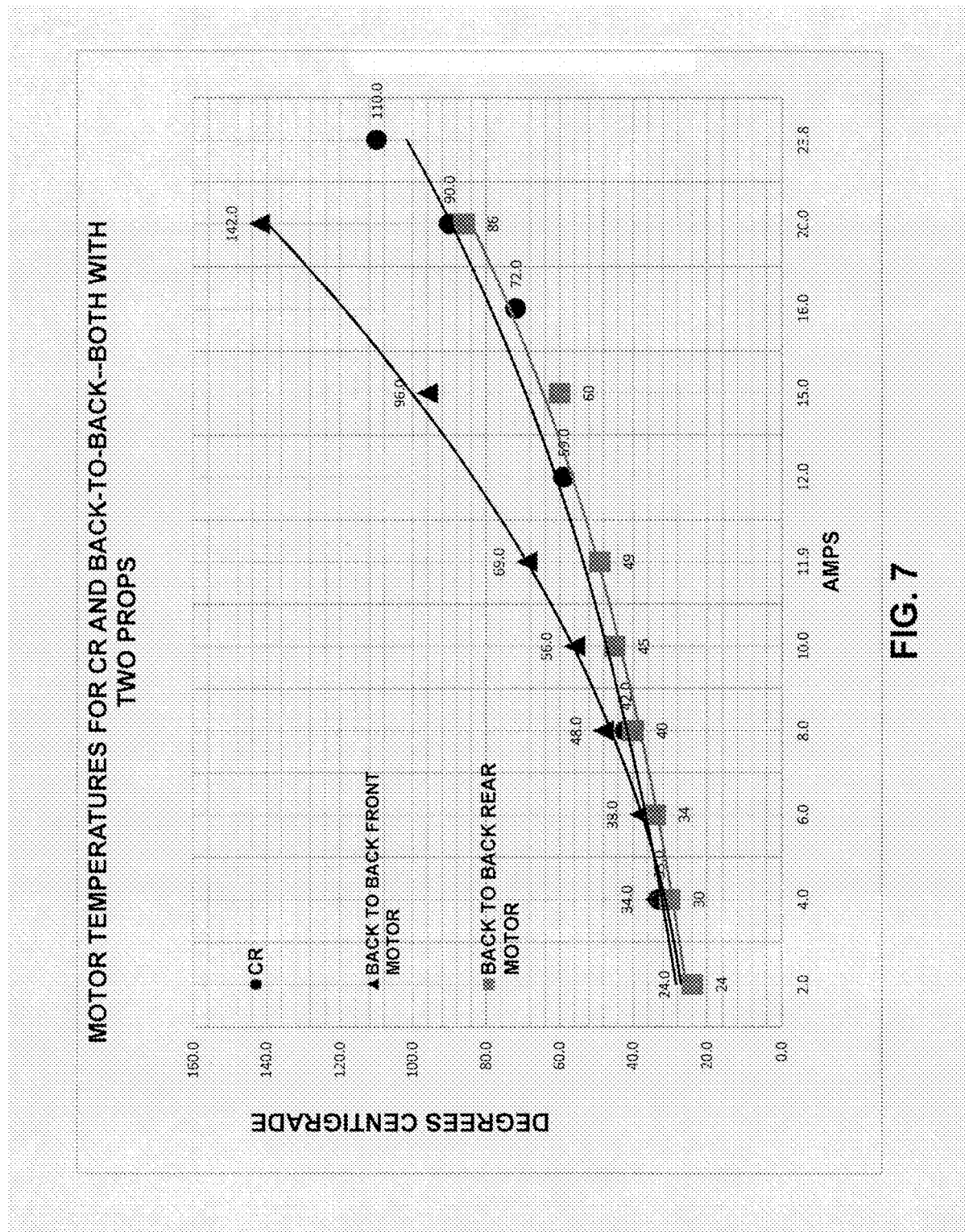
FIG. 7 is a graph of field coil temperature versus amps for a back-to-back motor system (temperatures are shown for the front and rear separate motors) compared with a CR motor.

Experiment #6: Pancake CR Motor with Two Props Versus Back-to-Back Standard Pancake Motors with Two Props The data shown below in Test #6 utilizes the pancake CR differential electric motor assembly described immediately above with a front 12 inch with 5.5 pitch propeller and a rear 15.5 inch with 8.0 pitch propeller on the pancake CR motor and two 12 inch with 5.5 pitch propellers on the back-to-back standard motors. As shown in FIG. 6 (thrust versus amps) and FIG. 7 (temperature versus amps), the pancake CR motor with two propellers shows approximately a 20% increase in thrust over the back-to-back pancake motors with two propellers and the pancake CR motor runs much cooler.

Experiment #7: Bench Tests with a Standard and CR Modified 3D Robotics Motor from their Solo Drone Test bench experiments were conducted with a standard and CR modified drone motor from 3D Robotics (3DR) Solo Drone (Offices in San Francisco, Calif.).

TABLE #7A

TEST #7
Stock 3D Robotics Motor
with Standard 3DR Propeller

| Amps | Thrust (oz) | Mount Waste (oz) | RPM |
|---|---|---|---|
| 2 | 10 | 2 | 4354 |
| 4 | 16 | 3 | 5875 |
| 6 | 20 | 5 | 6942 |
| 8 | 25 | 7 | 7796 |
| 10 | 29 | 10 | 8460 |

TABLE #6

TEST #6
TWO BACK-TO-BACK (BB) STANDARDS, EACH WITH A 12 INCH AND 5.5 PROP
CR HAS FRONT 12 INCH AND 5.5 PROP AND REAR 15.5 INCH AND 8.0 PROP
ALL RUNS ARE FOR 2.0 MINUTES

| MOTOR TYPE | TOTAL AMPS | AMPS PER MOTOR | VOLTS | AVERAGE LOAD | COIL TEMP C. - FRONT MOTOR | COIL TEMP C. - BACK MOTOR | AVERAGE COIL TEMP C. | CR TEMP C. |
|---|---|---|---|---|---|---|---|---|
| BB | 4.0 | 2.0 | 25.9 | 1.7 | 24.0 | 24 | 24 | |
| BB | 8.0 | 4.0 | 25.9 | 2.7 | 34.0 | 30 | 32 | 33.0 |
| BB | 12.0 | 6.0 | 25.9 | 3.6 | 38.0 | 34 | 36 | |
| BB | 16.0 | 8.0 | 25.9 | 4.2 | 48.0 | 40 | 44 | 42.0 |
| BB | 20.0 | 10.0 | 25.9 | 4.8 | 56.0 | 45 | 51 | |
| BB | 23.8 | 11.9 | 25.9 | 5.1 | 69.0 | 49 | 59 | |
| | | 12.0 | | | | | | 59.0 |
| BB | 30.0 | 15.0 | 25.9 | 6.0 | 96.0 | 60 | 78 | |
| | | 16.0 | | | | | | 72.0 |
| BB | 40.0 | 20.0 | 25.9 | 6.4 | 142.0 | 86 | 114 | 90.0 |
| | | 23.8 | | | | | | 110.0 |
| | | | | | COIL TEMP C. | | | |
| CR | 4.0 | | 25.9 | 1.9 | 33 | | | |
| CR | 8.0 | | 25.9 | 3.3 | 42 | | | |
| CR | 12.0 | | 25.9 | 4.1 | 59 | | | |
| CR | 16.0 | | 25.9 | 4.9 | 72 | | | |
| CR | 20.0 | | 25.9 | 5.9 | 90 | | | |
| CR | 23.8 | | 25.9 | 6.1 | 110 | | | |

TABLE #7B

TEST #7
Stock 3D Robotics
Motor with a Longer Propeller

| Amps | Thrust (oz) | Mount Waste (oz) | RPM |
|---|---|---|---|
| 2 | 10 | approx. same as above | 4295 |
| 4 | 17 | approx. same as above | 5729 |
| 6 | 21 | approx. same as above | 6710 |
| 8 | 25 | approx. same as above | 7540 |
| 10 | 30 | approx. same as above | 8197 |
| 11.3 | 31 | approx. same | 8450 |

Figure 8:
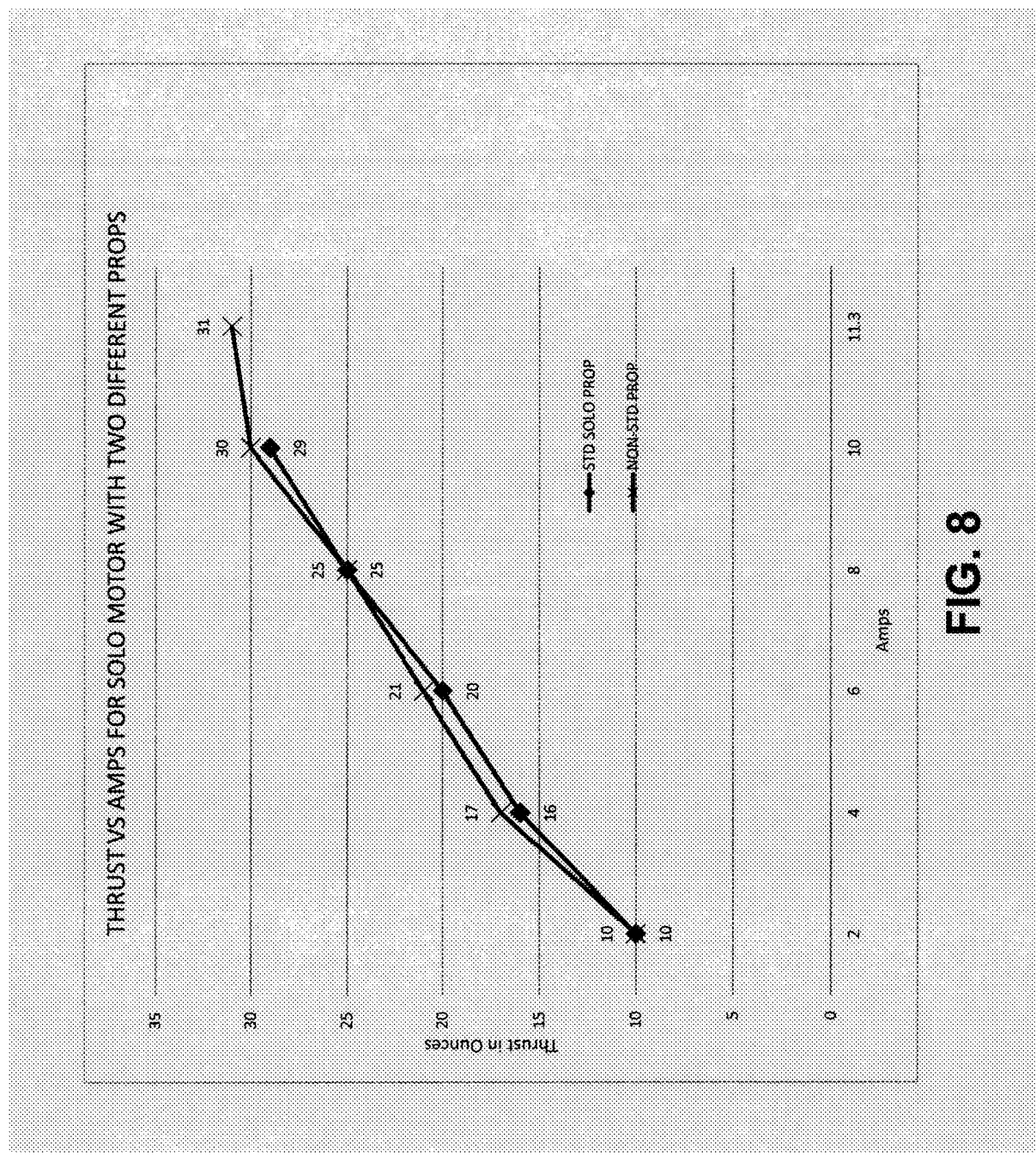
FIG. 8 is a graph of thrust versus amps for a standard motor fun with two different propellers.
Figure 9:
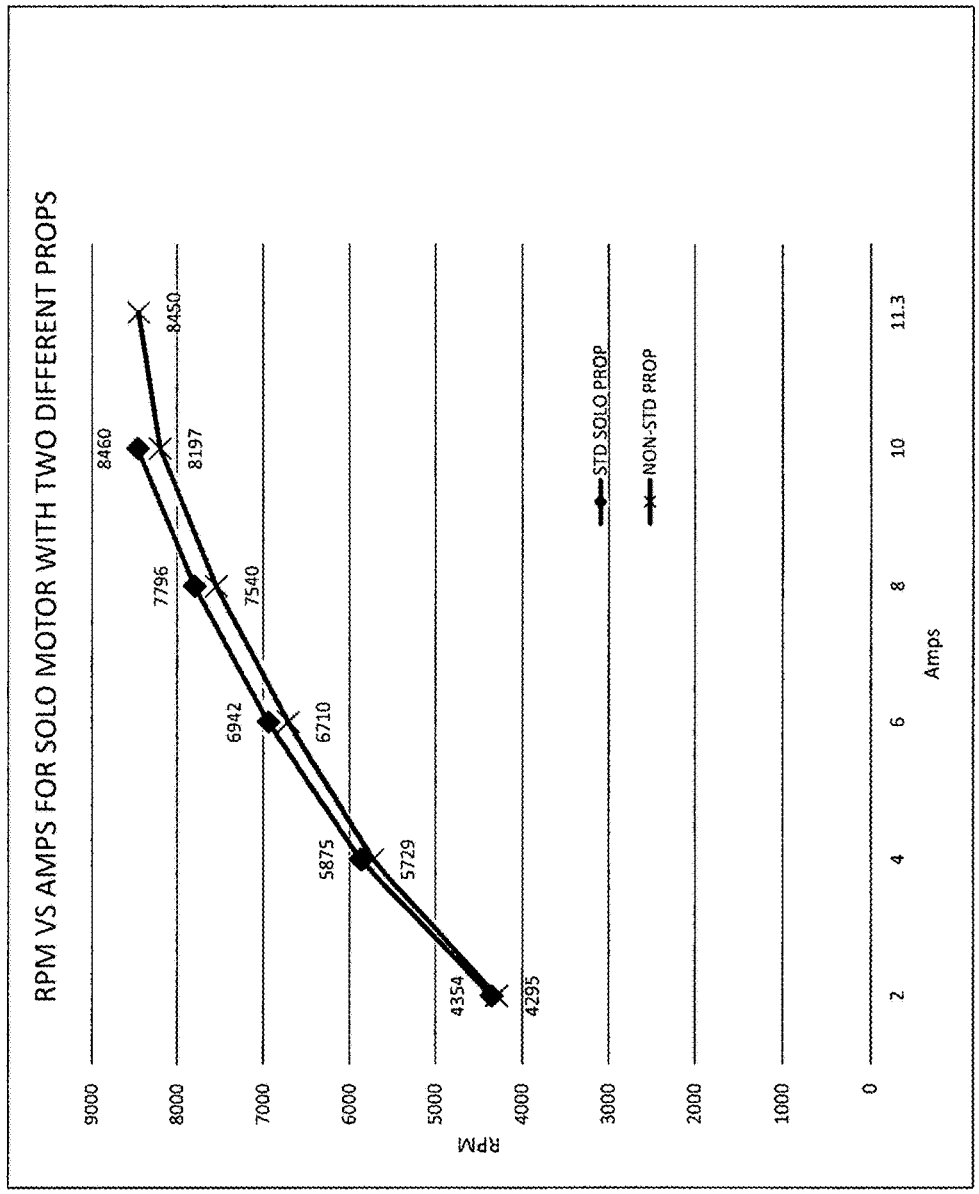
FIG. 9 is a graph of RPM versus amps for a standard motor fun with two different propellers.

Table 7A shows a standard propeller utilized by 3D Robotics in their commercially available Solo Drone. Clearly, energy is wasted to the motor mount (the ounces wasted are not scaled to a 1:1 ratio with the recorded ounces of thrust, but illustrates that energy is lost in utilizing a fixed motor mount). Table 7B illustrates that an alteration in the length of the propeller in an attempt to increase thrust did not significantly alter the test results seen in Table 7A. FIG. 8 shows the thrust versus amps data from Tables 7A and 7B, while FIG. 9 shows the RPM versus data from Tables 7A and 7B.

Figure 10:
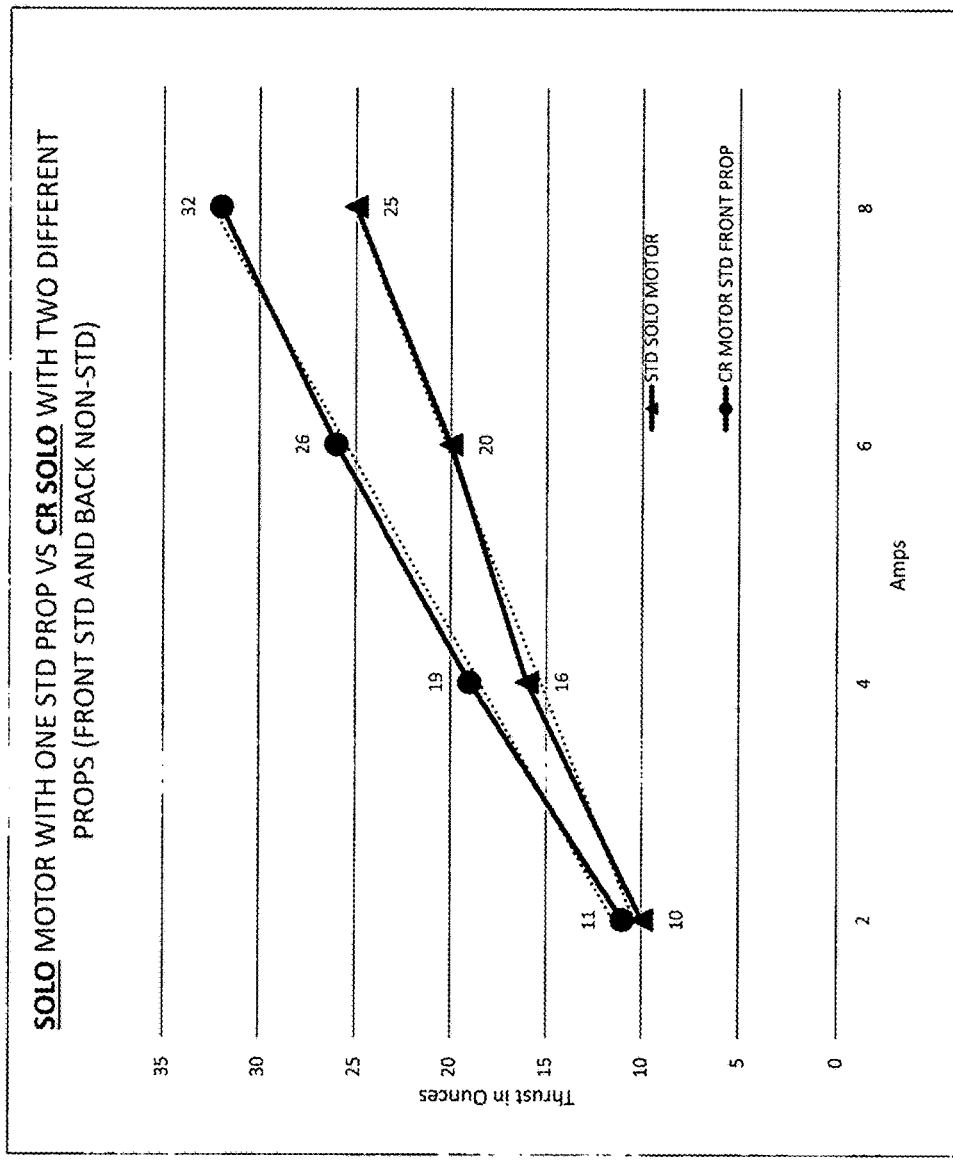
FIG. 10 is a graph of thrust versus amps for a standard motor (a standard 3D Robotics motor utilized on their Solo drone) with one standard propeller compared with a CR modified Solo motor that has a standard front propeller and a non-standard rear propeller.
Figure 11:
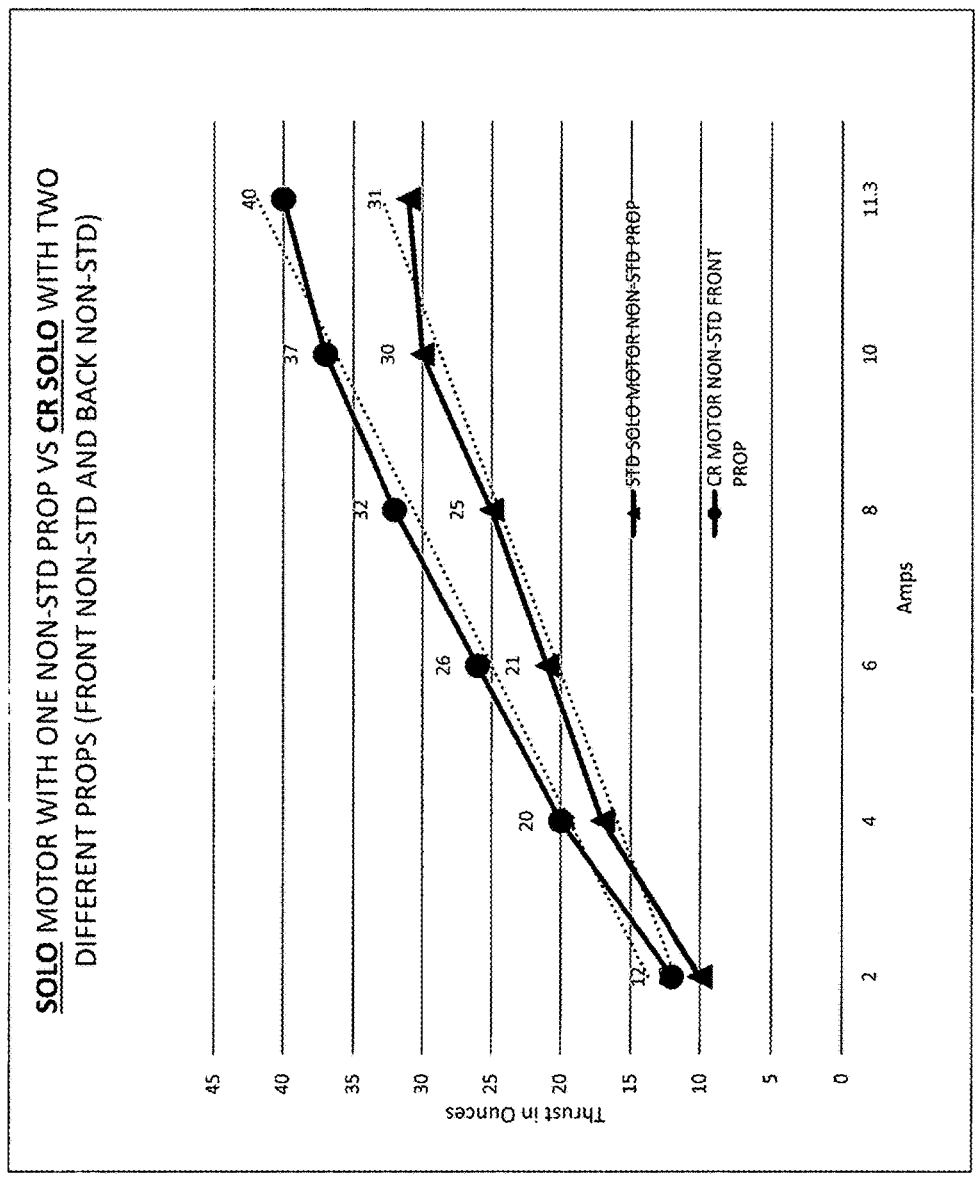
FIG. 11 is a graph of thrust versus amps for a standard motor (a standard 3D Robotics motor utilized on their Solo drone) with one non-propeller compared with a CR modified Solo motor two non-standard propellers.
Figure 12:
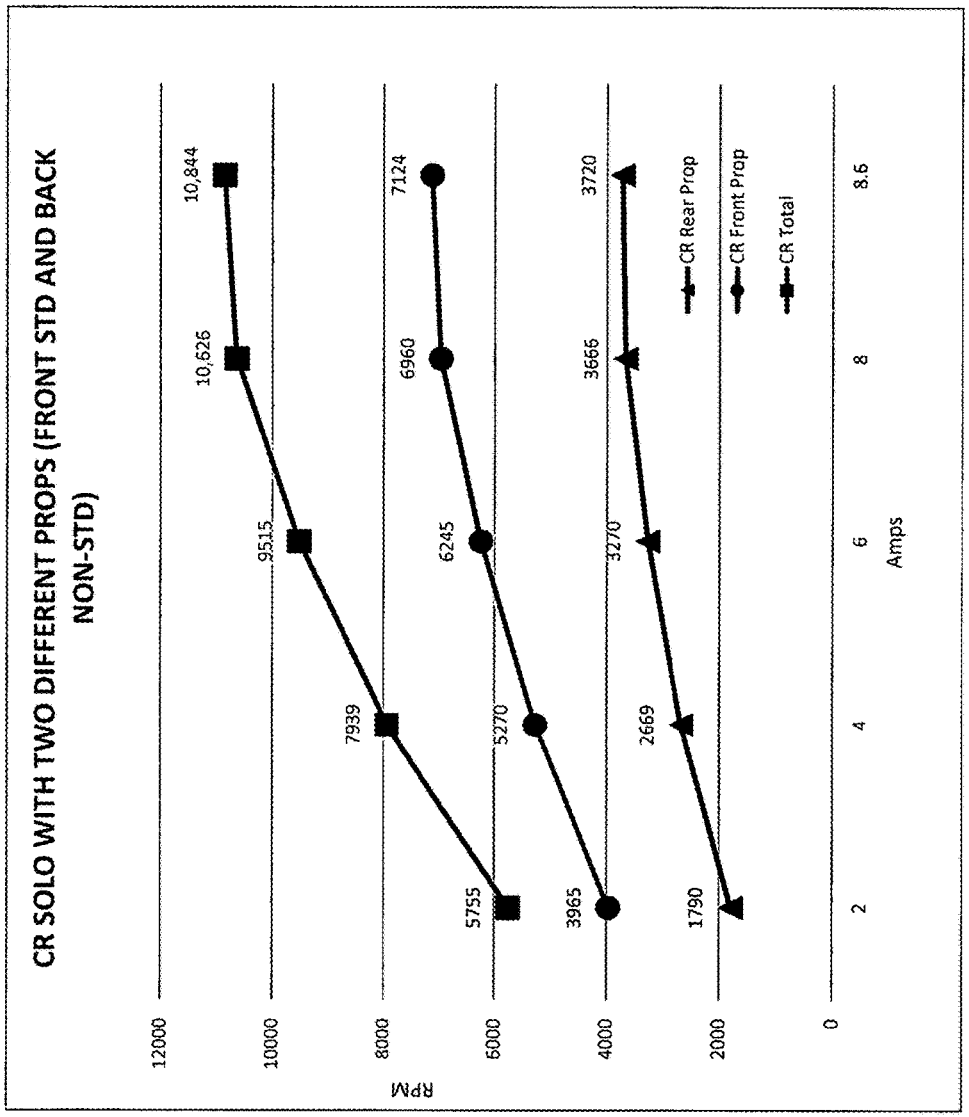
FIG. 12 is a graph of RPM versus amps for a CR modified Solo motor with a standard front propeller and a non-standard rear propeller showing front, rear, and combined/total RPM values.
Figure 13:
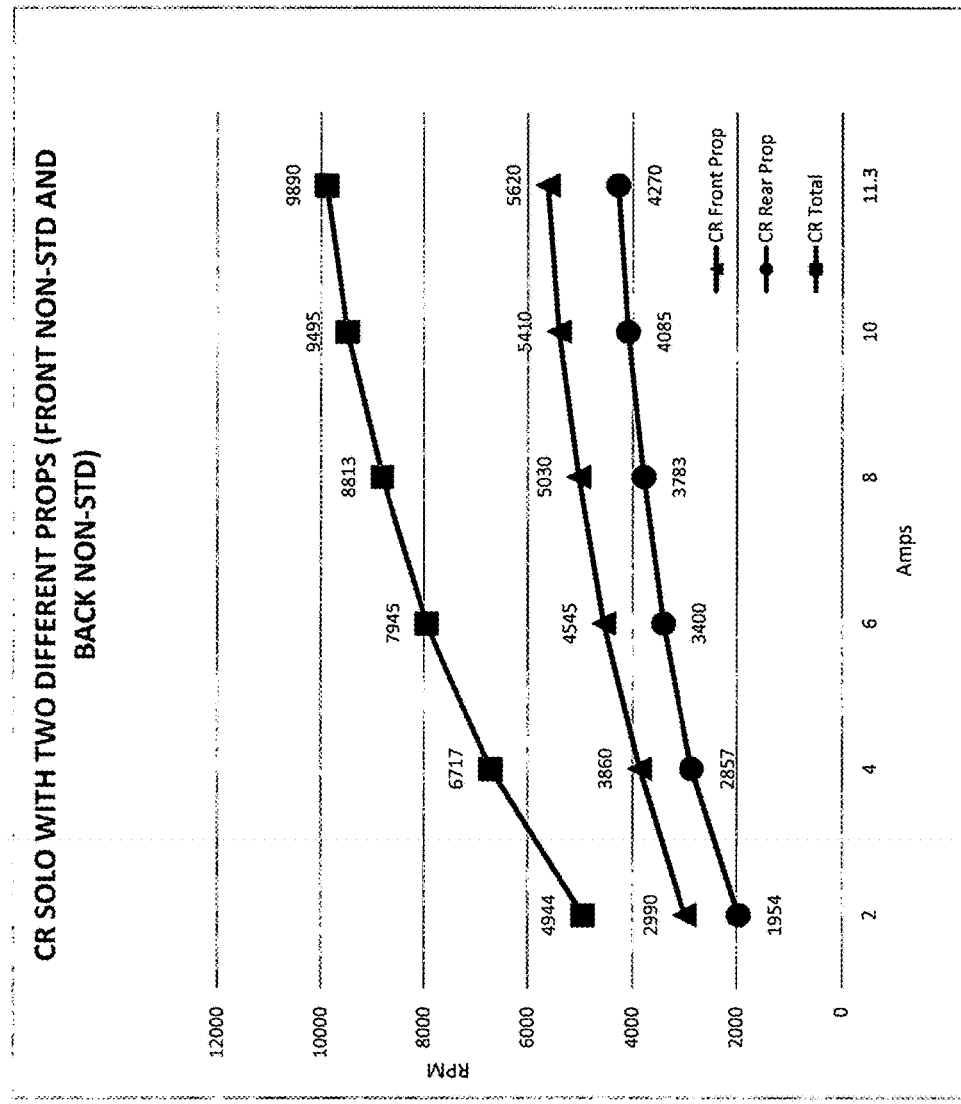
FIG. 13 is a graph of RPM versus amps for a CR modified Solo motor with a non-standard front propeller and a non-standard rear propeller showing front, rear, and combined/total RPM values.

Table 7C shows CR modified 3D Robotics motor (utilized in their commercially available Solo Drone) in which the front (F) propeller is of standard proportions and the rear (R) propeller is slightly longer. Table 7D shows CR modified 3D Robotics motor (utilized in their commercially available Solo Drone) in which both the front (F) propeller and the rear (R) propeller are non-standard lengths (slightly longer than standard). Clearly, energy that was wasted to the motor mount with a standard motor is no longer wasted in the CR adapted motor. Plainly, the CR motor has significantly increased thrust over the equivalent standard motor. FIG. 10 shows thrust versus amps for the standard Solo motor with one standard propeller versus a CR modified Solo motor with a standard front propeller and a slightly longer rear propeller. FIG. 11 shows thrust versus amps for the standard Solo motor with one non-standard propeller (slightly longer than a standard propeller) versus a CR modified Solo motor with two non-standard propellers (both slightly longer propellers than a standard one). Additionally, the CR motor has significantly increased total RPMs over the equivalent standard motor. FIG. 12 shows RPM versus amps data for the CR modified Solo motor with a standard front propeller and a slightly longer rear propeller. FIG. 13 shows RPM versus amps data for the CR modified Solo motor with both the front propeller and rear propeller that are slightly longer than standard propellers.

Figure 14:
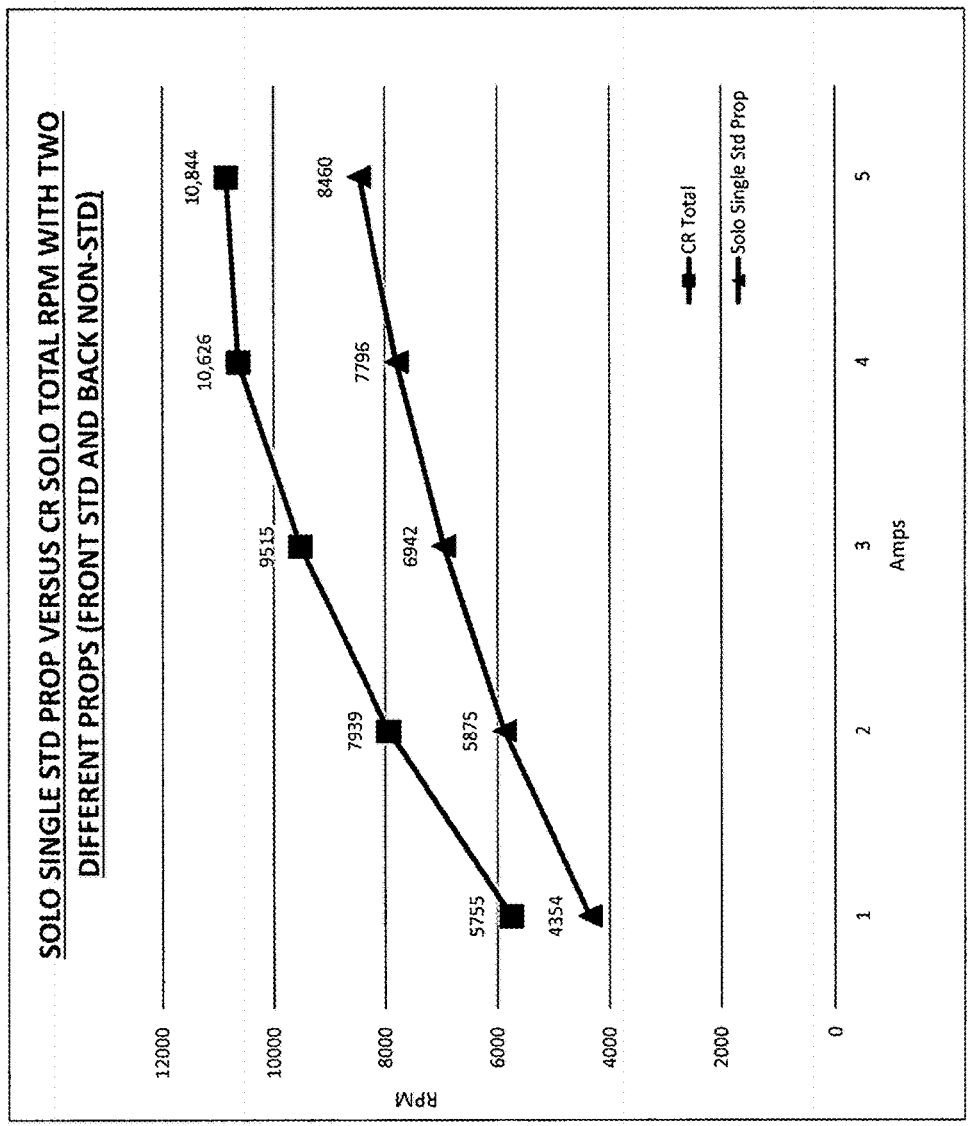
FIG. 14 is a graph of RPM versus amps for a standard Solo motor with one propeller versus a CR modified Solo motor with two propellers.

FIG. 14, shows the RPM values for the standard Solo motor versus are significantly less than the combined/total

TABLE #7C

TEST #7
CR Modified 3DR Motor with Standard 3DR Front Propeller and Non-Standard
(slightly longer than standard) Rear Propeller

| Amps | Thrust (oz) | % increase in Thrust for CR Motor over Table 7A Data | Mount Waste (oz) | F-RPM | R-RPM | TOTAL-RPM | % increase in CR Motor RPMs over Table 7A Data |
|---|---|---|---|---|---|---|---|
| 2 | 11 | 10 | 0 | 3965 | 1790 | 5755 | 32 |
| 4 | 19 | 19 | 0 | 5270 | 2669 | 7939 | 35 |
| 6 | 26 | 30 | 0 | 6245 | 3270 | 9515 | 37 |
| 8 | 32 | 28 | 0 | 6960 | 3666 | 10,626 | 36 |
| 8.6 | 33 | | 0 | 7124 | 3720 | 10,844 | |

TABLE #7D

TEST #7
CR Modified 3DR Motor with Non-Standard (slightly longer than standard) Front and Back
Propellers
TABLE #4 -

| Amps | Thrust (oz) | % increase in Thrust for CR Motor over Table 7B Data | Mount Waste (oz) | F-RPM | R-RPM | TOTAL-RPM | % increase in CR Motor RPMs over Table 7A Data |
|---|---|---|---|---|---|---|---|
| 2 | 12 | 20 | 0 | 2990 | 1954 | 4944 | 15 |
| 4 | 20 | 25 | 0 | 3860 | 2857 | 6717 | 17 |
| 6 | 26 | 30 | 0 | 4545 | 3400 | 7945 | 18 |
| 8 | 32 | 28 | 0 | 5030 | 3783 | 8813 | 17 |
| 10 | 37 | 28 | 0 | 5410 | 4085 | 9495 | 16 |
| 11.3 | 40 | 29 | 0 | 5620 | 4270 | 9890 | 17 |

RPM values for the CR modified Solo motor. Apparently, the two CR propellers have a synergistic influence on one another, thus producing a higher overall RPM result and more thrust.

Experiment #8: Battery Life Bench Tests with A Standard and CR Modified 3D Robotics Motors from their Solo Drone and Standard and CR Modified Pancake Motors Test bench experiments were conducted with a standard and CR modified drone motor from 3D Robotics Solo Drone (Offices in San Francisco, Calif.).

TABLE #8A

TEST #8
3D Robotics Solo Motors
Battery: Predator 3300 MA LI-PO (4 cell)

| MOTOR TYPE | THRUST IN LBS | STARTING VOLTAGE | ENDING VOLTAGE | AMP DRAW | AMP DECREASE | TOTAL RPM | RUN TIME IN MINS | INCREASE IN RUN TIME |
|---|---|---|---|---|---|---|---|---|
| STD | 1.1 | 16.7 | 12.4 | 4.7 |  | 6,000 | 43.9 |  |
| CR | 1.1 | 16.7 | 12.4 | 3.6 | 23.4% | 5,882 | 57.9 | 31.9% |

TABLE #8B

TEST #8
Pancake Motors
Battery: Lightmax 3000 MA LI-PO (6 cell)

| MOTOR TYPE | THRUST IN LBS | STARTING VOLTAGE | ENDING VOLTAGE | AMP DRAW | AMP DECREASE | TOTAL RPM | RUN TIME IN MINS | INCREASE IN RUN TIME |
|---|---|---|---|---|---|---|---|---|
| STD | 3.0 | 24.9 | 17.9 | 12.4 |  | 6,000 | 13.7 |  |
| CR | 3.0 | 24.9 | 17.9 | 8.7 | 29.8% | 6,000 | 21.3 | 55.5% |

Tables 8A and 8B show that the subject CR motors have a dramatically increased battery life compared with standard motors and significantly decreased amp usage.

From the above experiments, it is noted, among other demonstrated characteristics, that: 1) The subject CR motor accesses/utilizes the energy normally lost to the supporting mount with traditional motors, thereby increasing significantly the measurable thrust of the CR motor; 2) The subject CR motor runs dramatically cooler than a traditional motor, thereby increasing CR motor life over a standard motor; 3) The CR oppositely rotating propellers are internally differentially coupled to one another and operate synergistically, thereby increasing the total RPMs of the CR motor over a traditional motor; and 4) The subject CR motor occupies an operational volume not much larger than a traditional motor, thereby permitting easy replacement of a standard motor with a more powerful, efficient, and cooler running CR motor.

A first embodiment of the subject invention includes a dual propeller CR differential electric motor assembly; comprising: a) a central shaft having first and second ends; b) a first rotational member, located proximate the first end of the central shaft, that rotates in a first direction about the central shaft; c) a first propeller secured to the first rotational member; d) a second rotational member, located between the first rotational member and the second end of the central shaft, that rotates in an opposite direction to the first rotational member's rotational direction and about the central shaft; e) a second propeller secured to the second rotational member; f) electro-magnetic means (this includes permanent magnets on either rotation member with opposing electromagnets and electromagnets on both rotational members) associated with the first and second rotational members for powering the rotation of the first and second rotational members in opposite directions about the central shaft; g) means for transmitting electricity from an exterior power source to the electro-magnetic means (including slip ring assemblies, electrically conducting bearing assemblies, and the like), wherein the electricity transmitting means is located between the second rotational member and the second end of the central shaft; and h) means for mounting the oppositely rotating first and second rotational members and the central shaft to a supporting structure, wherein the mounting means (often a mounting plate) is associated with the central shaft and located after the electricity transmitting means and proximate second end of the central shaft.

A second embodiment of the subject invention includes a dual propeller CR differential electric motor assembly; comprising: a) a central shaft having upper and lower ends and oriented along a central axis that provides structural support for the CR differential electric motor assembly; b) an outer rotational member having a upper and lower exterior surfaces and an interior surface, wherein the outer rotational member rotates, during operation, in a first direction about the central axis, wherein the interior surface comprises: i) an outer perimeter wall; ii) an upper support structure; and iii) a lower support structure; c) a plurality of permanent magnets secured inside the first rotational member proximate the outer perimeter wall; d) a first bearing assembly secured to the outer rotational member that permits the outer rotational member to rotate in the first direction about the central axis; e) an inner rotational member that rotates, during operation, about the central axis in an opposite second direction to the first rotational member; wherein the inner rotational member comprises: i) a set of radially disposed field windings and ii) a second bearing assembly secured to the field windings that permits the field windings to rotate around the central axis between the permanent magnets and the central shaft in the second direction; f) an outer propeller assembly secured directly to the outer rotational member's exterior surface, wherein the outer propeller assembly comprises at least two propeller blades that extend from a central hub; g) an inner propeller assembly secured to the inner rotational member and positioned adjacent the outer rotational member's lower exterior surface, wherein the inner propeller assembly comprises: i) the second bearing assembly and ii) at least two propeller blades connected to the second bearing assembly; and h) means for carrying electricity to the field windings from an outside power supply, wherein the electricity carrying means is positioned adjacent to and below the inner propeller assembly, encircling the central shaft, and rotating with the inner propeller assembly in the second direction.

A third embodiment of the subject invention includes a thin-profile CR differential electric motor assembly utilized to power an aircraft vehicle, comprising: a) a central shaft having upper and lower ends and oriented along a central axis that provides structural support for the CR differential electric motor assembly; b) an outer rotational member having a upper and lower exterior surfaces and an interior surface, wherein the outer rotational member rotates, during operation, in a first direction about the central axis, wherein the interior surface comprises: i) an outer perimeter wall; ii) an upper support structure; and iii) a lower support structure; c) a plurality of permanent magnets secured inside the first rotational member proximate the outer perimeter wall; d) a first bearing assembly secured to the outer rotational member that permits the outer rotational member to rotate in the first direction about the central axis; e) an inner rotational member that rotates, during operation, about the central axis in an opposite second direction to the first rotational member; wherein the inner rotational member comprises: i) a set of radially disposed field windings and ii) a second bearing assembly secured to the field windings that permits the field windings to rotate around the central axis between the permanent magnets and the central shaft in the second direction; f) an outer propeller assembly secured directly to the outer rotational member's exterior surface, wherein the outer propeller assembly comprises at least two propeller blades that extend from a central hub; g) an inner propeller assembly secured to the inner rotational member and positioned adjacent the outer rotational member's lower exterior surface, wherein inner propeller assembly comprises: i) the second bearing assembly and ii) at least two propeller blades connected to the second bearing assembly; and h) means for carrying electricity to the field windings from an outside power supply, wherein the electricity carrying means is positioned adjacent to and below the inner propeller assembly, encircling the central shaft, and rotating with the inner propeller assembly in the second direction.

Also included in the subject invention is an embodiment wherein the first bearing assembly is located proximate the central shaft lower end and the central shaft rotates within the first bearing assembly. Further included is an embodiment wherein the first bearing assembly is located proximate the central shaft upper end and the central shaft is a non-rotating member of the CR differential electric motor assembly. Also, the second bearing assembly propeller blades may be detachable or foldable.

A further embodiment includes a propeller housing, secured to the second bearing assembly and the means for carrying electricity, into which the second bearing assembly propeller blades are mounted. Additionally, an embodiment includes a thin-profile CR differential electric motor assembly comprising a mounting member secured to the central shaft's lower end. Another embodiment includes an electronic controller for operating the motor and a power supply for powering the motor, wherein both are in communication with the electricity carrying means.

Still another embodiment includes a thin-profile CR differential electric motor assembly utilized to power an aircraft vehicle, comprising: a) a central shaft having upper and lower ends and oriented along a central axis that provides structural support for the CR differential electric motor assembly; b) an outer rotational member having a upper and lower exterior surfaces and an interior surface, wherein the outer rotational member rotates, during operation, in a first direction about the central axis, wherein the interior surface comprises: i) an outer perimeter wall; ii) an upper support structure; and iii) a lower support structure; c) a plurality of permanent magnets secured inside the first rotational member proximate the outer perimeter wall; d) a first bearing assembly secured to the outer rotational member that permits the outer rotational member to rotate in the first direction about the central axis, wherein the first bearing assembly is located proximate the central shaft lower end and the central shaft rotates within the first bearing assembly; e) an inner rotational member that rotates, during operation, about the central axis in an opposite second direction to the first rotational member; wherein the inner rotational member comprises: i) a set of radially disposed field windings and ii) a second bearing assembly secured to the field windings that permits the field windings to rotate around the central axis between the permanent magnets and the central shaft in the second direction; f) an outer propeller assembly secured directly to the outer rotational member's exterior surface, wherein the outer propeller assembly comprises at least two propeller blades that extend from a central hub; g) an inner propeller assembly secured to the inner rotational member and positioned adjacent the outer rotational member's lower exterior surface, wherein the inner propeller assembly comprises: i) the second bearing assembly and ii) at least two propeller blades connected to the second bearing assembly; and h) means for carrying electricity to the field windings from an outside power supply, wherein the electricity carrying means is positioned adjacent to and below the inner propeller assembly, encircling the central shaft, and rotating with the inner propeller assembly in the second direction.

Further comprising the subject invention is a thin-profile CR differential electric motor, wherein the second bearing assembly propeller blades are detachable and/or the second bearing assembly propeller blades are foldable. Additionally included is a propeller housing, secured to the second bearing assembly and the means for carrying electricity, into which the second bearing assembly propeller blades are mounted.

Also, the subject invention further comprises: a) a mounting member secured to the central shaft's lower end; b) an electronic controller for operating the motor in communication with the electricity carrying means; and c) a power supply for powering the motor in communication with the electricity carrying means.

Yet an additional embodiment of the subject invention is a thin-profile CR differential electric motor assembly utilized to power an aircraft vehicle, comprising: a) a central shaft having upper and lower ends and oriented along a central axis that provides structural support for the CR differential electric motor assembly; b) an outer rotational member having a upper and lower exterior surfaces and an interior surface, wherein the outer rotational member rotates, during operation, in a first direction about the central axis, wherein the interior surface comprises: i) an outer perimeter wall; ii) an upper support structure; and iii) a lower support structure; c) a plurality of permanent magnets secured inside the first rotational member proximate the outer perimeter wall; d) a first bearing assembly secured to the outer rotational member that permits the outer rotational member to rotate in the first direction about the central axis, wherein the first bearing assembly is located proximate the central shaft upper end and the central shaft is a non-rotating member of the CR differential electric motor assembly; e) an inner rotational member that rotates, during operation, about the central axis in an opposite second direction to the first rotational member; wherein the inner rotational member comprises: i) a set of radially disposed field windings and ii) a second bearing assembly secured to the field windings that permits the field windings to rotate around the central axis between the permanent magnets and the central shaft in the second direction; f) an outer propeller assembly secured directly to the outer rotational member's exterior surface, wherein the outer propeller assembly comprises at least two propeller blades that extend from a central hub; g) an inner propeller assembly secured to the inner rotational member and positioned adjacent the outer rotational member's lower exterior surface, wherein the inner propeller assembly comprises: i) the second bearing assembly and ii) at least two propeller blades connected to the second bearing assembly; and h) means for carrying electricity to the field windings from an outside power supply, wherein the electricity carrying means is positioned adjacent to and below the inner propeller assembly, encircling the central shaft, and rotating with the inner propeller assembly in the second direction.

Additionally embodiments comprise a thin-profile CR differential electric motor assembly, wherein the second bearing assembly propeller blades are detachable and/or the second bearing assembly propeller blades are foldable. Yet one more embodiment of the subject invention is a thin-profile CR differential electric motor assembly, further comprising a propeller housing, secured to the second bearing assembly and the means for carrying electricity, into which the second bearing assembly propeller blades are mounted.

Lastly, an embodiment of the subject invention comprises a thin-profile CR differential electric motor assembly, further comprising: a) a mounting member secured to the central shaft's lower end; b) an electronic controller for operating the motor in communication with the electricity carrying means; and c) a power supply for powering the motor in communication with the electricity carrying means.

Embodiments of the subject technology may be described with reference to flowchart illustrations of methods and systems according to embodiments of the technology, and/or algorithms, formulae, or other computational depictions, which may also be implemented as computer program products. In this regard, each block or step of a flowchart, and combinations of blocks (and/or steps) in a flowchart, algorithm, formula, or computational depiction can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts, algorithms, formulae, or computational depictions support combinations of means for performing the specified functions, combinations of steps for performing the specified functions, and computer program instructions, such as embodied in computer-readable program code logic means, for performing the specified functions. It will also be understood that each block of the flowchart illustrations, algorithms, formulae, or computational depictions and combinations thereof described herein, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s), algorithm(s), formula(e), or computational depiction(s).

It will further be appreciated that the terms "programming" or "program executable" as used herein refer to one or more instructions that can be executed by a processor to perform a function as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors. It will further be appreciated that as used herein, that the terms processor, computer processor, central processing unit (CPU), and computer are used synonymously to denote a device capable of executing the instructions and communicating with input/output interfaces and/or peripheral devices.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural, chemical, and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A dual propeller counter-rotating (CR) differential electric motor assembly; comprising:
   a. a central shaft having first and second ends;
   b. a first rotational member, located proximate said first end of said central shaft, that rotates in a first direction about said central shaft;
   c. a first propeller secured to said first rotational member;
   d. a second rotational member, located between said first rotational member and said second end of said central shaft, that rotates in an opposite direction to said first rotational member's rotational direction and about said central shaft;
   e. a second propeller secured to said second rotational member;
   f. electro-magnetic means associated with said first and second rotational members for powering said rotation of said first and second rotational members in opposite directions about said central shaft;
   g. means for transmitting electricity from an exterior power source to said electro-magnetic means, wherein said electricity transmitting means is located between said second rotational member and said second end of said central shaft; and
   h. means for mounting said oppositely rotating first and second rotational members and said central shaft to a supporting structure, wherein said mounting means is associated with said central shaft and located after said electricity transmitting means and proximate second end of said central shaft.

2. A dual propeller counter-rotating (CR) differential electric motor assembly; comprising:
   a. a central shaft having upper and lower ends and oriented along a central axis that provides structural support for said CR differential electric motor assembly;
   b. an outer rotational member having a upper and lower exterior surfaces and an interior surface, wherein said outer rotational member rotates, during operation, in a first direction about said central axis, wherein said interior surface comprises:
      i. an outer perimeter wall;
      ii. an upper support structure; and
      iii. a lower support structure;
   c. a plurality of permanent magnets secured inside said first rotational member proximate said outer perimeter wall;
   d. a first bearing assembly secured to said outer rotational member that permits said outer rotational member to rotate in said first direction about said central axis;
   e. an inner rotational member that rotates, during operation, about said central axis in an opposite second direction to said first rotational member; wherein said inner rotational member comprises:
      i. a set of radially disposed field windings and
      ii. a second bearing assembly secured to said field windings that permits said field windings to rotate around said central axis between said permanent magnets and said central shaft in said second direction;
   f. an outer propeller assembly secured directly to said outer rotational member's exterior surface, wherein said outer propeller assembly comprises at least two propeller blades that extend from a central hub;
   g. an inner propeller assembly secured to said inner rotational member and positioned adjacent said outer rotational member's lower exterior surface, wherein said inner propeller assembly comprises:
      i. said second bearing assembly and
      ii. at least two propeller blades connected to said second bearing assembly; and
   h. means for carrying electricity to said field windings from an outside power supply, wherein said electricity carrying means is positioned adjacent to and below said inner propeller assembly, encircling said central shaft, and rotating with said inner propeller assembly in said second direction.

3. A thin-profile CR differential electric motor assembly utilized to power an aircraft vehicle, comprising:
   a. a central shaft having upper and lower ends and oriented along a central axis that provides structural support for said CR differential electric motor assembly;
   b. an outer rotational member having a upper and lower exterior surfaces and an interior surface, wherein said outer rotational member rotates, during operation, in a first direction about said central axis, wherein said interior surface comprises:
      i. an outer perimeter wall;
      ii. an upper support structure; and
      iii. a lower support structure;
   c. a plurality of permanent magnets secured inside said first rotational member proximate said outer perimeter wall;
   d. a first bearing assembly secured to said outer rotational member that permits said outer rotational member to rotate in said first direction about said central axis;
   e. an inner rotational member that rotates, during operation, about said central axis in an opposite second direction to said first rotational member; wherein said inner rotational member comprises:
      i. a set of radially disposed field windings and
      ii. a second bearing assembly secured to said field windings that permits said field windings to rotate around said central axis between said permanent magnets and said central shaft in said second direction;
   f. an outer propeller assembly secured directly to said outer rotational member's exterior surface, wherein said outer propeller assembly comprises at least two propeller blades that extend from a central hub;
   g. an inner propeller assembly secured to said inner rotational member and positioned adjacent said outer rotational member's lower exterior surface, wherein said inner propeller assembly comprises:
      i. said second bearing assembly and
      ii. at least two propeller blades connected to said second bearing assembly; and
   h. means for carrying electricity to said field windings from an outside power supply, wherein said electricity carrying means is positioned adjacent to and below said inner propeller assembly, encircling said central shaft, and rotating with said inner propeller assembly in said second direction.

4. A thin-profile CR differential electric motor assembly according to claim 3, wherein said first bearing assembly is located proximate said central shaft lower end and said central shaft rotates within said first bearing assembly.

5. A thin-profile CR differential electric motor assembly according to claim 3, wherein said first bearing assembly is located proximate said central shaft upper end and said central shaft is a non-rotating member of the CR differential electric motor assembly.

6. A thin-profile CR differential electric motor assembly according to claim 3, wherein said second bearing assembly propeller blades are detachable.

7. A thin-profile CR differential electric motor assembly according to claim 3, wherein said second bearing assembly propeller blades are foldable.

8. A thin-profile CR differential electric motor assembly according to claim 3, further comprising a propeller housing, secured to said second bearing assembly and said means for carrying electricity, into which said second bearing assembly propeller blades are mounted.

9. A thin-profile CR differential electric motor assembly according to claim 3, further comprising a mounting member secured to said central shaft's lower end.

10. A thin-profile CR differential electric motor assembly according to claim 3, further comprising an electronic controller for operating the motor and a power supply for powering the motor, wherein both are in communication with said electricity carrying means.

11. A thin-profile CR differential electric motor assembly utilized to power an aircraft vehicle, comprising:
   a. a central shaft having upper and lower ends and oriented along a central axis that provides structural support for said CR differential electric motor assembly;
   b. an outer rotational member having a upper and lower exterior surfaces and an interior surface, wherein said outer rotational member rotates, during operation, in a first direction about said central axis, wherein said interior surface comprises:
      i. an outer perimeter wall;
      ii. an upper support structure; and
      iii. a lower support structure;
   c. a plurality of permanent magnets secured inside said first rotational member proximate said outer perimeter wall;
   d. a first bearing assembly secured to said outer rotational member that permits said outer rotational member to rotate in said first direction about said central axis, wherein said first bearing assembly is located proximate said central shaft lower end and said central shaft rotates within said first bearing assembly;
   e. an inner rotational member that rotates, during operation, about said central axis in an opposite second direction to said first rotational member; wherein said inner rotational member comprises:
      i. a set of radially disposed field windings and
      ii. a second bearing assembly secured to said field windings that permits said field windings to rotate around said central axis between said permanent magnets and said central shaft in said second direction;
   f. an outer propeller assembly secured directly to said outer rotational member's exterior surface, wherein said outer propeller assembly comprises at least two propeller blades that extend from a central hub;
   g. an inner propeller assembly secured to said inner rotational member and positioned adjacent said outer rotational member's lower exterior surface, wherein said inner propeller assembly comprises:
      i. said second bearing assembly and
      ii. at least two propeller blades connected to said second bearing assembly; and
   h. means for carrying electricity to said field windings from an outside power supply, wherein said electricity carrying means is positioned adjacent to and below said inner propeller assembly, encircling said central shaft, and rotating with said inner propeller assembly in said second direction.

12. A thin-profile CR differential electric motor assembly according to claim 11, wherein said second bearing assembly propeller blades are detachable.

13. A thin-profile CR differential electric motor assembly according to claim 11, wherein said second bearing assembly propeller blades are foldable.

14. A thin-profile CR differential electric motor assembly according to claim 11, further comprising a propeller housing, secured to said second bearing assembly and said means for carrying electricity, into which said second bearing assembly propeller blades are mounted.

15. A thin-profile CR differential electric motor assembly according to claim 11, further comprising:
   a. a mounting member secured to said central shaft's lower end;
   b. an electronic controller for operating the motor in communication with said electricity carrying means; and
   c. a power supply for powering the motor in communication with said electricity carrying means.

16. A thin-profile counter-rotating (CR) differential electric motor assembly utilized to power an aircraft vehicle, comprising:
   a. a central shaft having upper and lower ends and oriented along a central axis that provides structural support for said CR differential electric motor assembly;
   b. an outer rotational member having a upper and lower exterior surfaces and an interior surface, wherein said outer rotational member rotates, during operation, in a first direction about said central axis, wherein said interior surface comprises:
      i. an outer perimeter wall;
      ii. an upper support structure; and
      iii. a lower support structure;
   c. a plurality of permanent magnets secured inside said first rotational member proximate said outer perimeter wall;
   d. a first bearing assembly secured to said outer rotational member that permits said outer rotational member to rotate in said first direction about said central axis, wherein said first bearing assembly is located proximate said central shaft upper end and said central shaft is a non-rotating member of the CR differential electric motor assembly;
   e. an inner rotational member that rotates, during operation, about said central axis in an opposite second direction to said first rotational member; wherein said inner rotational member comprises:
      i. a set of radially disposed field windings and
      ii. a second bearing assembly secured to said field windings that permits said field windings to rotate around said central axis between said permanent magnets and said central shaft in said second direction;
   f. an outer propeller assembly secured directly to said outer rotational member's exterior surface, wherein said outer propeller assembly comprises at least two propeller blades that extend from a central hub;
   g. an inner propeller assembly secured to said inner rotational member and positioned adjacent said outer rotational member's lower exterior surface, wherein said inner propeller assembly comprises:

i. said second bearing assembly and
ii. at least two propeller blades connected to said second bearing assembly; and h. means for carrying electricity to said field windings from an outside power supply, wherein said electricity carrying means is positioned adjacent to and below said inner propeller assembly, encircling said central shaft, and rotating with said inner propeller assembly in said second direction.

17. A thin-profile CR differential electric motor assembly according to claim 16, wherein said second bearing assembly propeller blades are detachable.

18. A thin-profile CR differential electric motor assembly according to claim 16, wherein said second bearing assembly propeller blades are foldable.

19. A thin-profile CR differential electric motor assembly according to claim 16, further comprising a propeller housing, secured to said second bearing assembly and said means for carrying electricity, into which said second bearing assembly propeller blades are mounted.

20. A thin-profile CR differential electric motor assembly according to claim 16, further comprising:

a. a mounting member secured to said central shaft's lower end;
b. an electronic controller for operating the motor in communication with said electricity carrying means; and
c. a power supply for powering the motor in communication with said electricity carrying means.

* * * * *